US012375667B2

(12) United States Patent
Grois et al.

(10) Patent No.: US 12,375,667 B2
(45) Date of Patent: Jul. 29, 2025

(54) PROCESSING VIDEO USING MASKING WINDOWS

(71) Applicant: Comcast Cable Communications, LLC, Philadelphia, PA (US)

(72) Inventors: Dan Grois, Beer-Sheva (IL); Alexander Giladi, Denver, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 53 days.

(21) Appl. No.: 17/806,364

(22) Filed: Jun. 10, 2022

(65) Prior Publication Data
US 2022/0400261 A1 Dec. 15, 2022

Related U.S. Application Data

(60) Provisional application No. 63/203,385, filed on Jul. 20, 2021, provisional application No. 63/209,589, filed on Jun. 11, 2021.

(51) Int. Cl.
H04N 19/124 (2014.01)
H04N 19/105 (2014.01)
H04N 19/136 (2014.01)
H04N 19/142 (2014.01)
H04N 19/147 (2014.01)
H04N 19/167 (2014.01)
H04N 19/172 (2014.01)

(52) U.S. Cl.
CPC ......... H04N 19/124 (2014.11); H04N 19/105 (2014.11); H04N 19/136 (2014.11); H04N 19/142 (2014.11); H04N 19/147 (2014.11); H04N 19/167 (2014.11); H04N 19/172 (2014.11)

(58) Field of Classification Search
CPC .. H04N 19/124; H04N 19/105; H04N 19/136; H04N 19/142; H04N 19/147; H04N 19/167; H04N 19/172
See application file for complete search history.

(56) References Cited

U.S. PATENT DOCUMENTS 5,565,920 A 10/1996 Lee et al.
7,218,842 B1* 5/2007 Zhang ................. H04N 19/513
386/294
7,856,054 B1 12/2010 Kasarabada et al.
2007/0153892 A1* 7/2007 Yin ..................... H04N 19/124
375/E7.181

(Continued)

*Primary Examiner* — Kyle M Lotfi
(74) *Attorney, Agent, or Firm* — BakerHostetler

(57) ABSTRACT

A first quantization value for encoding at least one frame of a content item may be determined based at least on a predetermined bitrate and a point in the content item associated with a scene change. A first duration associated with a first portion of the content item may be determined. The first portion of the content item may comprise the at least one frame and may be associated with the first quantization value. A second quantization value for encoding at least another frame of the content item may be determined based at least on the predetermined bitrate. A second duration associated with a second portion of the content item may be determined. The second portion of the content item may comprise the at least another frame and may be associated with the second quantization value.

20 Claims, 11 Drawing Sheets

(56) References Cited

U.S. PATENT DOCUMENTS

| | | | | |
|---|---|---|---|---|
| 2014/0072035 A1* | 3/2014 | Rabii | .................... | H04L 65/762 |
| | | | | 375/240.03 |
| 2014/0198845 A1* | 7/2014 | Kalva | .................. | H04N 19/132 |
| | | | | 375/240.26 |
| 2016/0088298 A1* | 3/2016 | Zhang | .................. | H04N 19/176 |
| | | | | 375/240.03 |
| 2018/0376153 A1* | 12/2018 | Gokhale | .............. | H04N 19/147 |
| 2023/0028249 A1* | 1/2023 | Kwong | ................ | H04N 19/124 |

* cited by examiner

601

PROCESSING VIDEO USING MASKING WINDOWS

CROSS-REFERENCE TO RELATED APPLICATIONS

This application claims the benefit of U.S. Provisional Patent Application No. 63/209,589 filed Jun. 11, 2021 and U.S. Provisional Patent Application No. 63/203,385, filed Jul. 20, 2021, the contents of which are hereby incorporated by reference in their entireties.

BACKGROUND

Video compression techniques may be used to compress video content in an efficient manner, thereby enabling high-quality video content to be provided to customers while minimizing the bandwidth required to transmit that video content. As video quality continues to improve, the computational complexities for processing the video content and the bitrate for transmitting the video content may also increase. There is currently a need to reduce bitrate, particularly for high-resolution video content, without decreasing perceived video content quality and while keeping computational complexity at a reasonable level.

SUMMARY

Methods and systems for improved media content (e.g., video content) compression are described herein. A point within a content item (e.g. a video content item) may be determined based on a scene change in the content item. For example, the point may occur when the scene change occurs in the content item. A first quantization value may be determined for encoding at least one frame of the content item. The first quantization value may be determined based at least on a predetermined bitrate and the point. For example, determining the first quantization value may comprise determining a quantization value that minimizes a cost function. The cost function may be equal to a sum of a distortion threshold and a function of a quantization parameter multiplied by the predetermined bitrate. A first duration associated with a first portion of the content item may be determined based on encoding the at least one frame using the first quantization value. The first portion of the content item may comprise the at least one frame and may be associated with the first quantization value.

A second quantization value for encoding at least another frame of the content item may be determined. The second quantization value may be determined based at least on the predetermined bitrate. For example, determining the second quantization value may comprise determining a different quantization value that minimizes the cost function. A second duration associated with a second portion of the content item may be determined based on encoding the at least another frame using the second quantization value. The second portion of the content item may the at least another frame and may associated with the second quantization value.

BRIEF DESCRIPTION OF THE DRAWINGS

The following detailed description is better understood when read in conjunction with the appended drawings. For the purposes of illustration, examples are shown in the drawings; however, the subject matter is not limited to specific elements and instrumentalities disclosed. In the drawings.

DETAILED DESCRIPTION OF ILLUSTRATIVE EMBODIMENTS

Figure 1:
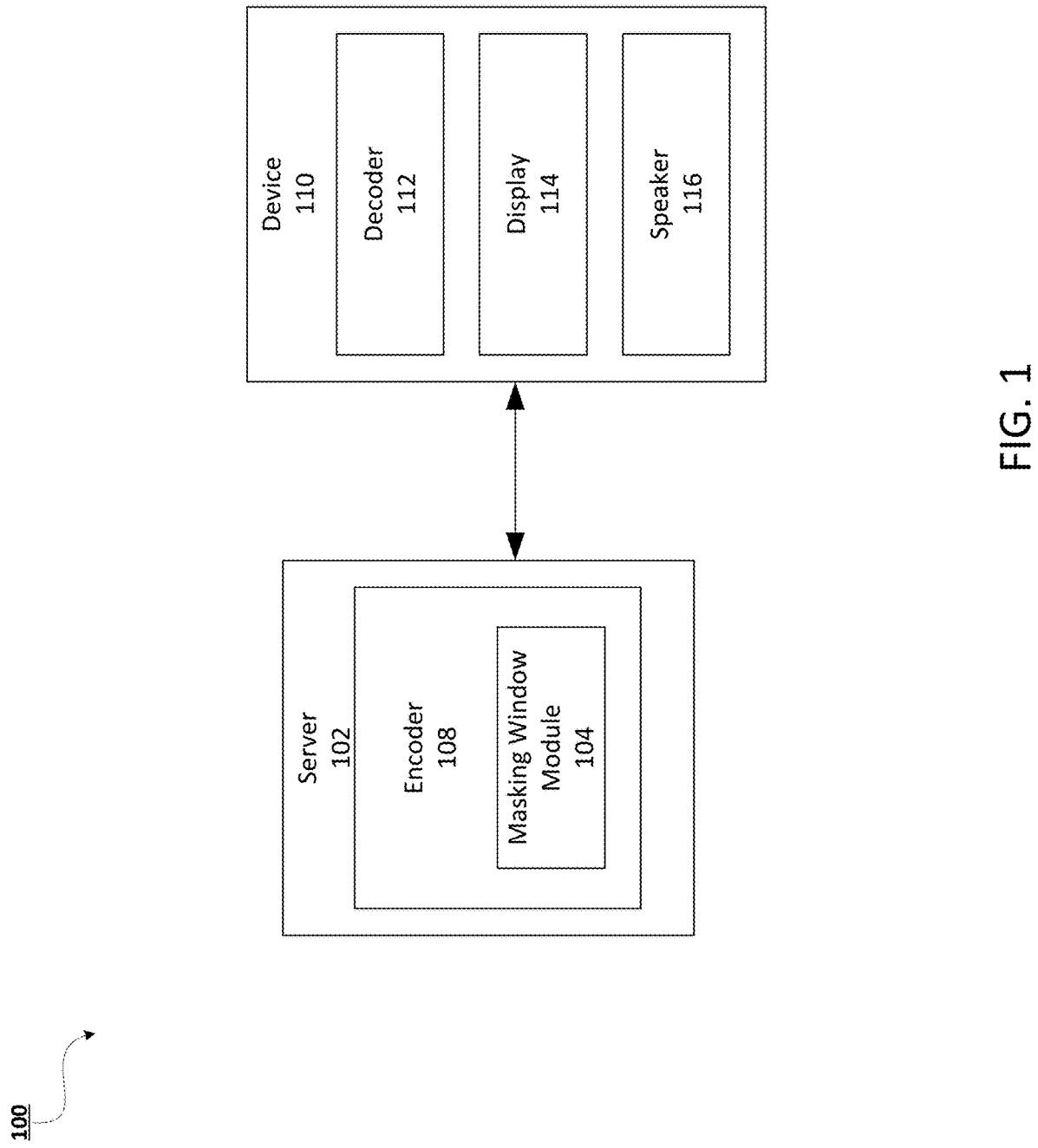
FIG. 1 shows an example system.

The first version of the H.265/MPEG-HEVC (High Efficiency Video Coding) standard enabled for the efficient compression of high-resolution video content (e.g., 3840×2160 (4K) video) as compared to its predecessor H.264/MPEG-AVC. This compression provided a good trade-off between the visual quality of the content and its corresponding bitrate. The H.266/MPEG-VVC (Versatile Video Coding) standard is being developed with the ultra-high-definition UltraHD and high frame rate video requirements in mind (such as 7680×4320 (8K) video). However, the average computational complexity of VVC is expected to be several times higher than of its predecessor (e.g., HEVC). There is currently a need to reduce bitrate, particularly for high-resolution video content, without decreasing perceived video content quality and while keeping computational complexity at a reasonable level.

Content, such as video content, may be separated into many scenes. Each of these scenes may be separated by scene cuts. A scene cut may indicate a change in scene in the video content (e.g. a new frame displaying new content). A particular content item may comprise a large quantity of scene cuts. For example, a scene cut may occur every second or every two seconds (or any other period of time) in a content item. Different types of content may comprise more scene cuts. For example, an action movie may comprise a large number of scene cuts because the camera is continually shifting from side-to-side in order to capture the action. Scene cut(s) in a content item may be determined, for example, using well-known tools.

The human visual system (e.g. the eyes, the connecting pathways through to the visual cortex and other parts of the brain) may not be able to detect when content frames are removed immediately before or after a scene cut. The human visual system ("HVS") may notice the scene cut but may not notice what occurred immediately before or after the scene cut. For example, if content is being output (e.g. played back) at a rate of 30 frames-per-second (fps) and five frames are removed immediately before the scene cut, the HVS may not notice the removal of these five frames. Accordingly, removing frames immediately before or after a scene cut may reduce bitrate, particularly for high-resolution video content, while having no impact on the perceived, or subjective, content quality.

However, this approach of dropping frames immediately before or after a scene cut has its shortcomings. For example, only a certain number of frames may be dropped. This may be the number of frames that may be dropped before being perceived by the HVS. The number of frames that may be dropped before being perceived by the HVS may be dependent on framerate and/or type of content. Dropping this number of frames may not always be enough to sufficiently reduce the bitrate.

Accordingly, methods and systems are described for improved video compression. A joint backward and forward temporal masking may be employed in order to reduce the bitrate without perceptibly affecting visual quality (as perceived by the HVS). More specifically, an adaptive scene cut-aware quantization mechanism that considers a temporal distance between each frame of the content item and the closest scene cut may be employed. One or more masking windows may be utilized before a scene cut and one or more masking windows may be utilized after a scene cut.

Each masking window may be associated with a different quantization value (e.g. parameter). The quantization value associated with each window may be dynamically (e.g. adaptively) determined as the content item is being encoded. Quantization, involved in content processing, is a lossy compression technique achieved by compressing a range of values. When the number of discrete symbols in a given stream is reduced, the stream becomes more compressible. For example, reducing the number of colors required to represent a digital image makes it possible to reduce its file size. Accordingly, by encoding a particular content item utilizing a higher quantization value, the content stream may become more compressible (and therefore have a reduced file size).

However, increasing the quantization value may result in more artifacts in the content item once it is decoded. An artifact is a noticeable distortion of a content item caused by the application of lossy compression, such as quantization. Lossy data compression involves discarding some of the content item's data so that it becomes small enough to be stored within the desired disk space or transmitted (e.g. streamed) within the available bandwidth (known as the data rate or bit rate). Because a portion of the content item's data has been discarded, artifacts may appear in the content item once it is decoded. The more artifacts that appear in the content item, the less desirable the viewing experience may be for the end-user consuming the content item.

As discussed above, the HVS may notice a scene cut in a content item but may not notice what occurred immediately before or after the scene cut. Accordingly, the masking window(s) that occur closest-in-time to the scene cut(s) in a content item may be associated with higher quantization values than those masking windows that are further away in time from a scene cut. For example, the masking windows immediately adjacent to a scene cut may be associated with the highest quantization values because, even if a large number of artifacts appear in these portions of the content item, the HVS may not notice or detect the artifacts in these portions of the content item. Similarly, the further away a masking window is from a scene cut, the lower the quantization value associated with this masking window may be. This is because the HVS is more likely to notice or detect artifacts in the portions of the content item that are not immediately before or after a scene cut. The quantization value associated with each masking window, the quantity of masking windows before and after each scene cut, and/or the duration of each of the masking windows may be dynamically determined as the content item is being encoded.

FIG. 1 shows a block diagram of an example system 100. The system 100 may comprise a server 102 and a device 110. The server 102 may be configured to determine a plurality of masking windows associated with a content item (e.g. video content item). For example, the server 102 may be configured to determine a quantity of masking windows before and/or after each scene cut, the duration of each of the masking windows, and/or a quantization value (e.g. parameter) associated with each of the masking windows. The server 102 may comprise a masking window module 104 and an encoder 108. As shown in FIG. 1, the masking window module 104 may be a component of the encoder 108. Alternatively, the masking window module 104 may be separate from the encoder 108. The device 110 may be configured to output (e.g. play back) content. The device 110 may be any device capable of outputting content items, such as a set-top box, a mobile telephone, a tablet, or a personal computer. The device 110 may comprise a decoder 112, a display 114 and a speaker 116.

The masking window module 104 may be configured to determine one or more masking windows before a scene cut and/or one or more masking windows after a scene cut in a content item. Each masking window may comprise at least one frame of the content item. A masking window before a scene cut may be a backward masking window. A masking window after a scene cut may be a forward masking window. The scene cut(s) in a content item may be determined using well-known tools. As discussed above, a content item may comprise a large quantity of scene cuts. For example, a scene cut may occur every second or every two seconds (or any other period of time) in a content item. Different types of content (e.g. different genres) may comprise more or less scene cuts than other types of content. For example, the masking window module 104 may be configured to determine one or more masking windows before a scene cut and one or more masking windows after a scene cut in a content item while encoding the content item.

The masking window module 104 may be configured to determine a quantization value associated with each masking window. The quantization value associated with a particular masking window may be the quantization value utilized to encode the frame(s) that belong to that particular masking window. As discussed above, a masking window close to (e.g. adjacent to) a scene cut may be encoded utilizing a greater quantization value than a masking window that is further away from a scene cut—the HVS may not be able to detect artifacts that appear in the content frame(s) that occur immediately before and/or after a scene cut. Accordingly, the masking window module 104 may determine greater quantization values for those masking windows that occur close-in-time to a scene cut and lower quantization values for those masking windows that occur further-in-time from a scene cut.

To determine the quantization value associated with a particular masking window, the masking window module 104 may perform Rate-Distortion-Optimization (RDO). RDO is a method of improving video quality in video compression. The name RDO refers to the optimization of the amount of distortion (loss of video quality) against the amount of data required to encode the video (e.g. the rate).

For example, the H.265/MPEG-HEVC video coding standard is considered to be much more comprehensive that its predecessor H.264/MPEG-AVC. HEVC allows to partition each video frame into a plurality of square-shaped coding tree blocks (CTBs), which are the basic processing units of HEVC. CTBs come in variable sizes—16×16, 32×32 or 64×64 samples, and along with the associated syntax elements, one luma CTB and corresponding two chroma CTBs form a coding tree unit (CTU). Generally, the larger CTU sizes result at better coding efficiency in high resolutions. This comes at a price of a noticeable increase in computational complexity. A hierarchical quadtree partitioning structure used by HEVC, splits CTU into one or more coding units (CUs) of variable sizes, between 8×8 and 64×64. Additionally, for both the intra-picture (spatial) and inter-picture (temporal motion-compensated) prediction, each CU can be further subdivided into smaller blocks along the coding tree boundaries. As a result, at least one prediction unit (PU) is defined for each CU in order to provide the prediction data, while the selected prediction mode indicates whether the CU (consisting of a single luma coding block (CB) and two chroma CBs) is coded using the intra-picture or inter-picture prediction. Further, for transform coding of the prediction residuals, each CB can be partitioned into multiple transform blocks (TBs), the size of which can also vary from 4×4 to 32×32. So, each CTB can be viewed as a root node of two trees: the coding tree, while the coding block (i.e. the leaf of the coding tree) is a root of the second tree—the transform tree or so called the residual quadtree (RQT). Therefore, the HEVC encoder has to make many "decisions" regarding the video frame partitioning in order to achieve an optimal coding gain as a function of estimated distortion (i.e. make decisions regarding optimal CU sizes, the optimal number of CU splits, etc.). Such a decision process is called Rate-Distortion Optimization, or in short RDO, the purpose of which is to select the best coding mode that leads to the smallest distortion for a given/target bitrate To determine the quantization value associated with a particular masking window, the masking window module 104 may minimize a cost function determined using the RDO process, where the cost function J is represented by the following:

$$J = D + \lambda \times R, \quad \text{Equation 1}$$

where D represents a distortion level, R represents the bit rate, and λ is a function of the quantization value.

The masking window module 104 may determine a quantization value that minimizes the cost function J. The value for R may be predetermined. For example, how many bits are allocated for every block in a frame may be predetermined. When encoding a content item, it may be known on which channel the content item is going to be transmitted and/or the desirable size of the content item may be known. Based on this known information, a target bitrate, R, may be identified and/or the bit rate, R, may be estimated. The masking window module 104 may determine a predetermined distortion threshold. The predetermined distortion threshold may be acceptable level of distortion D or an acceptable range of distortion D. The minimum of D is subject to $R < R_c$, where $R_c$ is a constraint. Accordingly, the minimum of D is related to the predetermined value of R.

As mentioned above, λ is a function of the quantization value. The masking window module 104 may determine, based on the predetermined value of R and the acceptable level or range of distortion D, a particular value λ that minimizes the function J. To find this particular value of λ that minimizes the function J, a quantization value that minimizes the function J may be determined. For example, the quantization value that minimizes the function J may be lower than a quantization value that results in the acceptable level or range of distortion D or results in exceeding the acceptable level or range of distortion D. The quantization value associated with a particular masking window may be the quantization value that the masking window module 104 has determined minimizes the function J. For example, to determine the quantization value based on the acceptable level or range of distortion D, the masking window module 104 may utilize a lookup table.

If a masking window comprises a plurality of frames, each of the plurality of frames may be encoded with the same, determined quantization value. Alternatively, each of the plurality of frames may be encoded with substantially the same quantization value. A quantization value may be determined individual for one or more of the frames in a masking window. If some of the frames of the plurality of frames are reference frames and some of the frames of the plurality of frames are non-reference frames, the reference frames may be associated with a different quantization value than the non-reference frames. The different quantization value associated with the reference frames may be only slightly different or may be substantially different. Generally, a reference frame is a frame which is used as a reference for encoding one or more other frames, e.g. future and/or past (previous) frames, within a given video. If too high of an impact is made on a reference frame, the reference frame will comprise artifacts. This will cause the future and/or past (previous) frames that refer to the reference frame to comprise even more artifacts—and this results in poor content quality for the end-viewer. Accordingly, the masking window module 104 may determine lower quantization values for the reference frame(s) in a masking window than the non-reference frame(s) in the masking window.

The masking window module 104 may additionally determine different quantization values for frames within a masking window based on frame type. A content item may comprise a number of different types of frames. For example, a content item may comprise one or more of an I-frame, a P-frame and a B-frame. An I-frame (i.e., an intra-coded picture) comprises an entirety of the image information associated with the frame. An I-frame may be encoded independent of all other frames of the media content. In contrast to I-frames, P and B frames may hold only part of the image information (the part that changes between frames), so they may need less space in the output file than an I-frame. A P-frame (i.e., a predicted picture) may hold only the changes in the image from the previous frame. For example, in a scene where a car moves across a stationary background, only the car's movements need to be encoded. The encoder does not need to encode the unchanging background pixels in the P-frame, thus saving space. P-frames are also known as delta-frames. A B-frame (i.e., a bidirectional predicted picture) saves even more space by using differences between the current frame and both the preceding and following frames to specify its content. I-frames may be encoded without information from other frames. Accordingly, I-frames, B-frames, and P-frames may each act as reference frames, and the masking window module 104 may determine lower quantization values for reference frames than non-reference frames.

The quantization offset may be the difference between the quantization values of two adjacent masking windows. The masking window module 104 may automatically adjust the determined quantization offset based on the type of frame. For example, the masking window module 104 may automatically adjust the determined quantization offset based on whether a frame is a reference frame, a non-reference frame, a P-frame, an I-frame, or a B-frame. For example, the quantization offset for a P-frame may be automatically reduced, such as by 30%, to improve the video quality and to increase coding gain. The quantization offset for an I-frame, regardless of whether the I-frame is a scene cut or not, may automatically be reduced to improve the video quality and to increase coding gain. For example, the quantization offset for an I-frame, regardless of whether the I-frame is a scene cut or not, may automatically be reduced to zero. As discussed above, the masking window module 104 may determine lower quantization values for reference frames than non-reference frames. Additionally, or alternatively, the quantization offset for a reference frame (I-frame, B-frame, or P-frame) may be automatically reduced.

The masking window module 104 may be configured to determine the size (e.g. duration, quantity of frames) of each masking window while encoding the content item. For example, the size (e.g. duration, quantity of frames) of each masking window may be determined using a lookup table. The duration of each masking window may be either relatively short (e.g. 1 ms to 500 ms) or relatively long (e.g. is or longer). To determine a size of each masking window, the masking window module 104 may be configured to monitor (e.g., in a closed loop during encoding), a distortion level associated with the encoded content item. The masking window module 104 may be configured to monitor, in a closed loop during encoding, a distortion level associated with each coding block of the encoded content item.

For example, while a forward masking window is being encoded using the quantization value determined for that masking window, such as by the encoder 108, the subjective distortion level (e.g. visible distortion level) may begin to increase. The subjective distortion level may indicate artifact visibility, with a higher subjective distortion level being indicative of a greater artifact visibility. The subjective distortion level may begin to increase as the encoder 108 begins to encode frame(s) of the content item, belonging to the forward masking window, that are further away from the scene cut. Subjective distortion may increase due to increased visibility (by the HVS) of artifacts. The level of subjective distortion may be estimated.

While a backward masking window is being encoded using the quantization value determined for that masking window, such as by the encoder 108, the subjective distortion level may begin to change. Whether the subjective distortion level increases or decrease may depend on the order in which the backwards masking windows are encoded. For example, if the backwards masking windows are encoded in the direction towards the scene cut (e.g. in display order) the subjective distortion level may begin to decrease as the encoder 108 begins to encode frame(s) of the content item, belonging to the backward masking window, that are closer to the scene cut. Alternatively, if the backwards masking windows are encoded in the direction starting at the scene cut and moving away from the scene cut (e.g. not in display order), the subjective distortion level may begin to increase as the encoder 108 begins to encode frame(s) of the content item, belonging to the backward masking window, that are further from the scene cut. Subjective distortion may decrease due to reduced visibility (by the HVS) of artifacts. Likewise, subjective distortion may increase due to increased visibility (by the HVS) of artifacts As the subjective distortion level continues to decrease or increase, it may eventually fail to satisfy a predetermined distortion threshold. The predetermined distortion threshold may be the acceptable level or range of distortion D, discussed above. Additionally, or alternatively, the predetermined distortion threshold may be a predefined Just Noticeable Difference (JND) threshold that represents the visibility of the Human Visual System (HVS). For example, as the frame(s) in a forward masking window are being encoded (using the quantization value associated with that particular masking window), the masking window module 104 may eventually determine that the subjective distortion level does not satisfy (e.g. exceeds) the predetermined distortion threshold. As the frame(s) in a backward masking window are being encoded (using the quantization value associated with that particular masking window), the masking window module 104 may eventually determine that the subjective distortion level does not satisfy (e.g. is too far below or exceeds, depending on the direction of encoding) the predetermined distortion threshold.

If the subjective distortion level does not satisfy the predetermined distortion threshold, the masking window module 104 may determine that that particular masking window (either forward or backward) needs to be terminated. If the masking window module 104 determines that a masking window needs to be terminated, masking window module 104 may determine that a new masking window needs to be generated. The new masking window may begin when the particular masking window terminates. If the masking window that is being terminated is a forward masking window, the new masking window may be associated with a lower quantization value than the terminated masking window because the new masking window is further-in-time from the scene cut. If the masking window that is being terminated is a backward masking window, the new masking window may be associated with a higher quantization value than the terminated masking window because the new masking window is closer-in-time to the scene cut.

The masking window module 104 may continue to monitor, in a closed loop during encoding the content item, the subjective distortion level. The masking window module 104 may continue to create any number of new masking windows, as necessary, if the subjective distortion is not at an acceptable level (e.g. does not satisfy the predetermined distortion threshold). Each time the masking window module 104 generates a new masking window, the masking window module 104 may determine a new quantization value associated with that new masking window. The duration of a masking window associated with a large quantization value may be shorter than the duration of a masking window associated with a smaller quantization value. This may be because the subjective distortion that results from using a larger quantization value becomes more noticeable to the HVS, more quickly.

The masking window module 104 may be configured to provide instructions to an encoder, such as the encoder 108. The instructions may be provided to the encoder 108 as the encoder is encoding the content item. The instructions may indicate the quantity of masking windows, the size (e.g. duration) of each masking window, the quantization parameter(s) associated with each masking window.

The encoder 108 may be configured to receive the instructions from the masking window module 104. The encoder 108 may use the received instructions to convert the content item from one format to another format, such as one amenable to the means by which the end-viewers consume the content. For example, encoding the content item may comprise converting the content item from a Flash Video (FLV) format to an MPEG-4 video stream. Encoding the content item may comprise compressing the content item using digital audio/video compression, such as MPEG, or any other type of compression standards.

Mechanisms have been devised that allow changing the resolution of a video sequence in the coding loop, and without the use of intra coded pictures. As those technologies require the resampling of reference pictures, they are commonly known as reference picture resampling (RPR) or adaptive resolution change (ARC) techniques. The VVC standard, discussed briefly above, allows frames from different group-of-pictures ("GOPS") having different resolutions to be reference frames.

A GOP is a collection of successive pictures within a coded video stream. Each coded video stream consists of successive GOPs, from which the visible frames are generated. Pre-HEVC, if a decoder encountered a new GOP in a compressed video stream, this meant that the decoder did not need any previous frames in order to decode the next ones. With HEVC, the decoder may refer to previous frames in earlier GOPS. However, under the HEVC standard, the decoder may not refer to previous frames of differing resolution in earlier GOPS. Under the VVC standard, if two GOPS exist, a frame in the first GOP may be referenced from a frame in the second GOP, even if the resolution of the two frames is different. This is discussed in more detail below, with regard to FIGS. 3-5.

The encoder 108 may be configured to determine resolution changes for GOPS. For example, the encoder 108 may be configured to determine whether the frame(s) in a GOP should be encoded with a higher or lower resolution. For example, if the bandwidth drops, the encoder may determine that the frames in a GOP should be encoded with a lower resolution than the frames in a previous GOP. Under VVC, the lower-resolution frames in the later GOP may still refer to the higher-resolution frames in the earlier GOP. If the bandwidth increases, the encoder may determine that the frames in a GOP should be encoded with a higher resolution than the frames in a previous GOP. Under VVC, the higher-resolution frames in the later GOP may still refer to the lower-resolution frames in the earlier GOP.

The encoder 108 may use this VVC RPR technique in conjunction with the masking window technique, described above. For example, if the bandwidth drops, the encoder 108 may determine that the frames in a GOP should be encoded with a lower resolution than the frames in a previous GOP. In addition to, or as an alternative to lowering the resolution, the encoder 108 may determine that the quantization value should be lowered (e.g. a new masking window should begin) if encoding is occurring in the direction away from the scene cut. If the VVC RPR technique is used in conjunction with the masking window technique (e.g. the resolution is lowered and the quantization value is lowered), the amount that the quantization value is lowered may affect how much the resolution is lowered. The encoder 108 may utilize these two techniques in parallel to provide optimal visual quality for the change in bitrate.

The decoder 112 of the device 110 may be configured to receive the encoded video segments from the server 102 and may be configured to decode the one or more video segments. The decoder 112 may decode the video segments based on information received from the server 102 and/or information stored at the decoder 112 such as device-specific or standards-specific decoding information. The decoder 112 may be configured to decompress and/or reconstruct the received video segments from the encoder 108 such that the one or more video segments may be played back by the device 110.

The display 114 of the device 110 may be configured to display content to one or more viewers. The display 114 may be any device capable of displaying video or image content to a viewer, such as a tablet, a computer monitor, or a television screen. The display 114 may be part of the device 110 such as in the example that the device 110 is a tablet or a computer. The display 114 may be separate from the device 110 such as in an example that the device 110 is a set top box and the display 114 is a television screen in electrical communication with the set top box.

The speaker 116 may be configured to output audio associated with the content. The speaker 116 may be any device capable of outputting audio content. The speaker 116 may be part of the device 110 such as in the example that the device 110 is streaming player or a tablet or a computer. The speaker 116 may be separate from the device 110 such as in an example that the device 110 is a set top box and the speaker 116 is a television or other external speaker in electrical communication with the set top box.

Figure 2:
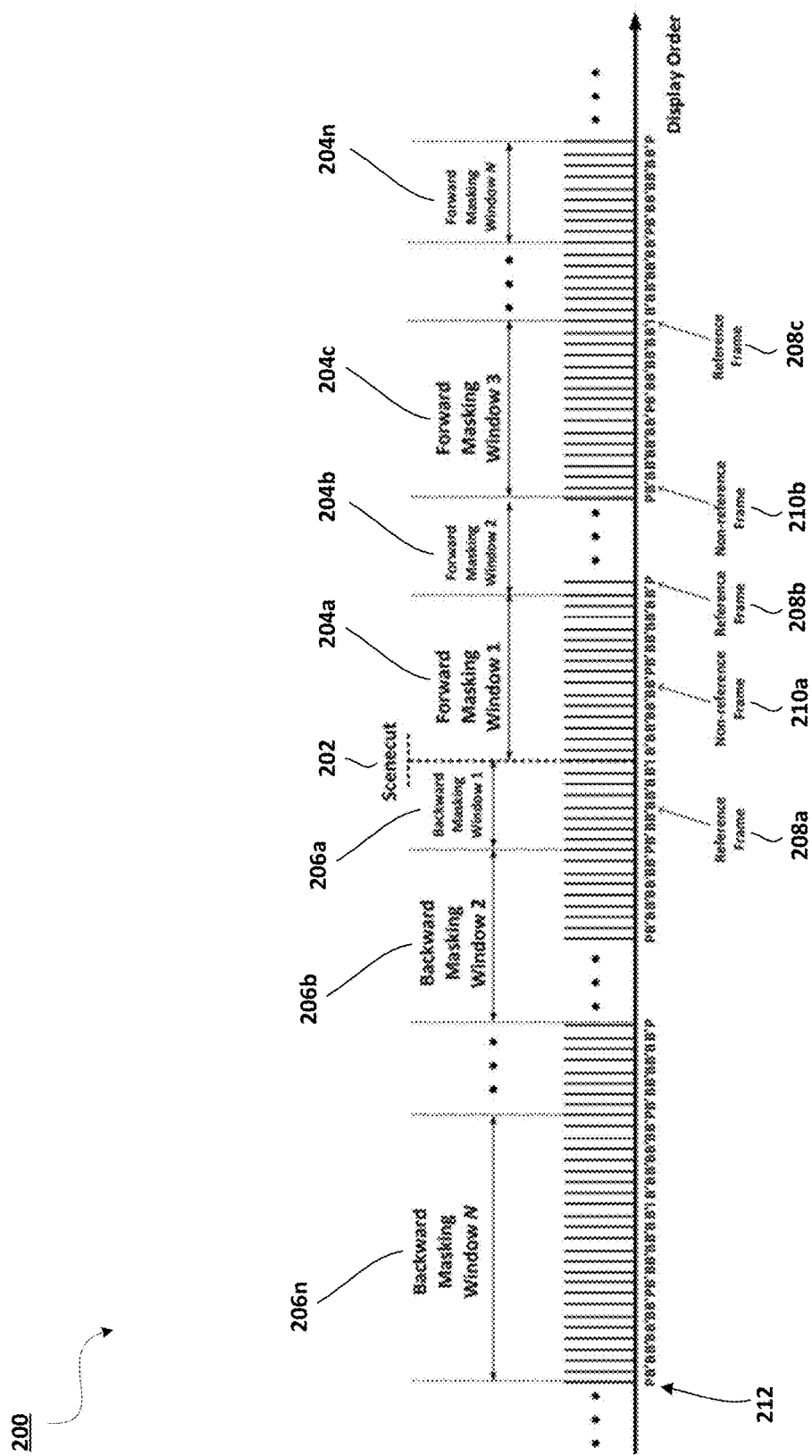
FIG. 2 shows an example set of masking windows.

FIG. 2 shows an example set of masking windows 200 associated with a content item. The content item may comprise a scene cut 202. As discussed above, a scene cut may indicate a change in scene in the video content (e.g. a new frame displaying new content). While only one scene cut 202 is depicted in FIG. 2, a content item may comprise a large quantity of scene cuts. For example, a scene cut may occur every second or every two seconds (or any other period of time) in a content item. Different types of content (e.g. different genres) may comprise more or less scene cuts than other types of content. The scene cut 202 may be determined using conventional, well-known tools.

A plurality of forward masking windows 204a-n may be employed after the scene cut 202. The plurality of forward masking windows 204a-n may comprise any quantity of forward masking windows. Each of the plurality of forward masking windows 204a-n may be associated with a different quantization value. Accordingly, each of the plurality of forward masking windows 204a-n may be associated with a different content quality level. The quantization value associated with each of the forward masking windows 204a-n may be determined by the masking window module 104 in the manner described above with reference to FIG. 1.

As the forward masking window 204a is closest-in-time to (e.g. immediately adjacent to) to the scene cut 202, the forward masking window 204a may be associated with the greatest quantization value out of all of the forward masking windows 204a-n. Likewise, as the forward masking window 204n is furthest-in-time from the scene cut 202, the forward masking window 204n may be associated with the smallest quantization value out of all of the forward masking windows 204a-n. This is because the HVS may notice the scene cut 202 but may not notice what occurred immediately before or after the scene cut 202—as a result, the HVS may not notice artifacts that are introduced immediately before or after the scene cut 202.

As discussed above, if a masking window, such as one of the forward masking windows 204a-n, comprises a plurality of frames, each of the plurality of frames may be encoded with the same, determined quantization value. Alternatively, each of the plurality of frames may be encoded with substantially the same quantization value. A quantization value may be determined individual for one or more of the frames in a masking window. If some of the frames of the plurality of frames are reference frames (e.g. frames 208a-c) and some of the frames of the plurality of frames are non-reference frames (e.g. frames 210a-b), the reference frames may be associated with a different quantization value than the non-reference frames within the same masking window. For example, lower quantization values may be determined for the reference frame(s) in a masking window than the non-reference frame(s) in the masking window.

The size of each of the forward masking windows 204a-n may be determined as the content item is being encoded. The size of a masking window may be indicated by how many frame(s) are included in the masking window. For example, the first frame after the scene cut 202 may begin to be encoded. This first frame may belong to the forward masking window 204a. A first quantization value associated with the first frame after the scene cut 202 may be determined. It may then be determined how many frames can be encoded using the first quantization value without being detectable by the HVS. This may be the quantity of frames included in the forward masking window 204a.

For example, to determine how many frames may be encoded using the first quantization value without being detectable by the HVS, the subjective distortion level associated with encoding the content using the first quantization value may be monitored, as described above. For example, as frame(s) continue to be encoded (using the first quantization value), it may eventually be determined that the subjective distortion level no longer satisfies the predetermined distortion threshold.

If the subjective distortion level no longer satisfies the predetermined distortion threshold, the forward masking window 204a may terminated and a new masking window, the forward masking window 204b, may begin. The forward masking window 204b may be associated with a lower quantization value than the forward masking window 204a because the forward masking window 204b is further-in-time from the scene cut 202. This process of terminating masking windows when the subjective distortion no longer satisfies the predetermined distortion threshold and starting a new masking window associated with new quantization values may be repeated until forward masking window 204n and its associated quantization value are determined.

A plurality of backward masking windows 206a-n may be employed before the scene cut 202. The plurality of backward masking windows 206a-n may comprise any quantity of backward masking windows. For example, the plurality of backward masking windows 206a-n may comprise a different quantity of windows from the plurality of forward masking windows 204a-n. Alternatively, the plurality of backward masking windows 206a-n may comprise the same quantity of windows from the plurality of forward masking windows 204a-n. Each of the plurality of backward masking windows 206a-n may be associated with a different quantization value. Accordingly, each of the backward masking windows 206a-n may be associated with a different content quality level. The quantization value associated with each of the backward masking windows 206a-n may be determined by the masking window module 104 in the manner described above with reference to FIG. 1.

As the backward masking window 206n is furthest-in-time away from the scene cut 202, the backward masking window 206n may be associated with the smallest quantization value out of all of the backward masking windows 206a-n. Likewise, as the backward masking window 206a is closest-in-time to the scene cut 202, the backward masking window 206a may be associated with the greatest quantization value out of all of the backward masking windows 206a-n. This is because the HVS may notice the scene cut 202 but may not notice what occurred immediately before or after the scene cut 202—as a result, the HVS may not notice artifacts that are introduced immediately before or after the scene cut 202.

The backward masking windows 206a-n may be encoded either in display order or in the reverse of display order. If the backward masking windows 206a-n are encoded in display order, the frame 212 furthest away from the scene cut 202 may begin to be encoded first. This frame 212 may belong to the backward masking window 206n. A first quantization value associated with the frame 212 may be determined. It may then be determined how many frames can be encoded using the first quantization value without being detectable by the HVS. This may be the quantity of frames included in the backward masking window 206n. If the backward masking windows 206a-n are encoded in the reverse of display order, a different frame closest to (e.g. occurring immediately before) the scene cut 202 may begin to be encoded first. This different frame may belong to the backward masking window 206a. A first quantization value associated with the different frame may be determined. It may then be determined how many frames can be encoded using the first quantization value without being detectable by the HVS. This may be the quantity of frames included in the backward masking window 206a.

The size of each of the backward masking windows 206a-n may be determined as the content item is being encoded. The size of a masking window may be indicated by how many frame(s) are included in the masking window. To determine how many frames may be encoded using the first quantization value without being detectable by the HVS, the subjective distortion level associated with encoding the content using the first quantization value may be monitored, as described above. For example, as frame(s) continue to be encoded (using the first quantization value), it may eventually be determined that the subjective distortion level no longer satisfies the predetermined distortion threshold.

If the backward masking windows 206a-n are encoded in display order, the subjective distortion may continue to decrease as frames closer to the scene cut 202 begin to be encoded. If the subjective distortion level no longer satisfies the predetermined distortion threshold (e.g. is too far below the predetermined distortion threshold), the backward masking window 206n may terminated and a new backward masking window may begin. The new backward masking window may be closer to the scene cut 202 than the backward masking window 206n. The new backward masking window may be associated with a higher quantization value than the backward masking window 206n because the new backward masking window is closer-in-time to the scene cut 202. This process of terminating masking windows when the subjective distortion no longer satisfies the predetermined distortion threshold and starting a new masking window associated with new quantization values may be repeated until backward masking window 206a and its associated quantization value are determined.

If the backward masking windows 206a-n are encoded in the reverse of display order, the subjective distortion may continue to increase as frames further-in-time from the scene cut 202 begin to be encoded. If the subjective distortion level no longer satisfies the predetermined distortion threshold (e.g. exceeds the predetermined distortion threshold), the backward masking window 206a may terminated and a new backward masking window 206b may begin. The new backward masking window 206b may be further-in-time from the scene cut 202 than the backward masking window 206a. The new backward masking window 206b may be associated with a lower quantization value than the backward masking window 206a because the new backward masking window 206b is further-in-time from the scene cut 202. This process of terminating masking windows when the subjective distortion no longer satisfies the predetermined distortion threshold and starting a new masking window associated with new quantization values may be repeated until backward masking window 206n and its associated quantization value are determined.

As discussed above, before VVC, it was not possible to refer to frames in different GOPS with different resolutions.

For example, before VVC it was not possible to downsample or upsample frames in a later GOP using frames of a different resolution in an earlier GOP. Downsampling is the reduction in spatial resolution while keeping the same two-dimensional (2D) representation of the frame. It is typically used to reduce the storage and/or transmission requirements of images. Upsampling is the increasing of the spatial resolution while keeping the 2D representation of the frame.

Figure 3:
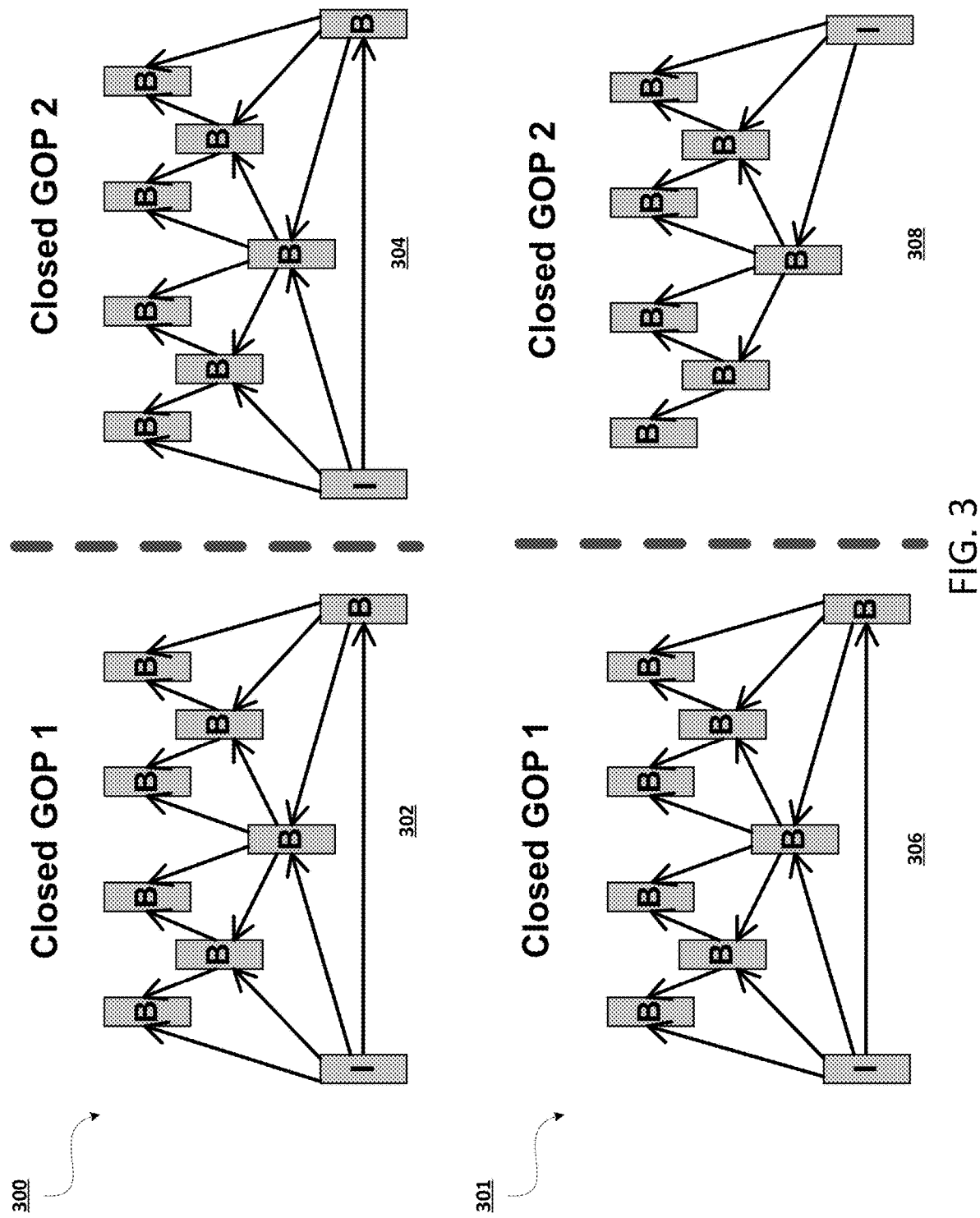
FIG. 3 shows example set of closed GOP structures.

FIG. 3 shows two sets 300, 301 of pre-VVC "closed-GOPS." In the set 300 of closed-GOPS, the frames in the GOP 304 may not refer to the frames in the GOP 302. For example, each B-frame in the GOP 302 may only refer to other B-frames in the GOP 302 or the I-frame in the GOP 302. Likewise, each B-frame in the GOP 304 may only refer to other B-frames in the GOP 304 or the I-frame in the GOP 304. I-frames are not very compressed, so a lot of bits are required to encode them. Accordingly, the pre-VVC "closed-GOPS," which each comprise an I-frame, are not ideal.

Figure 4:
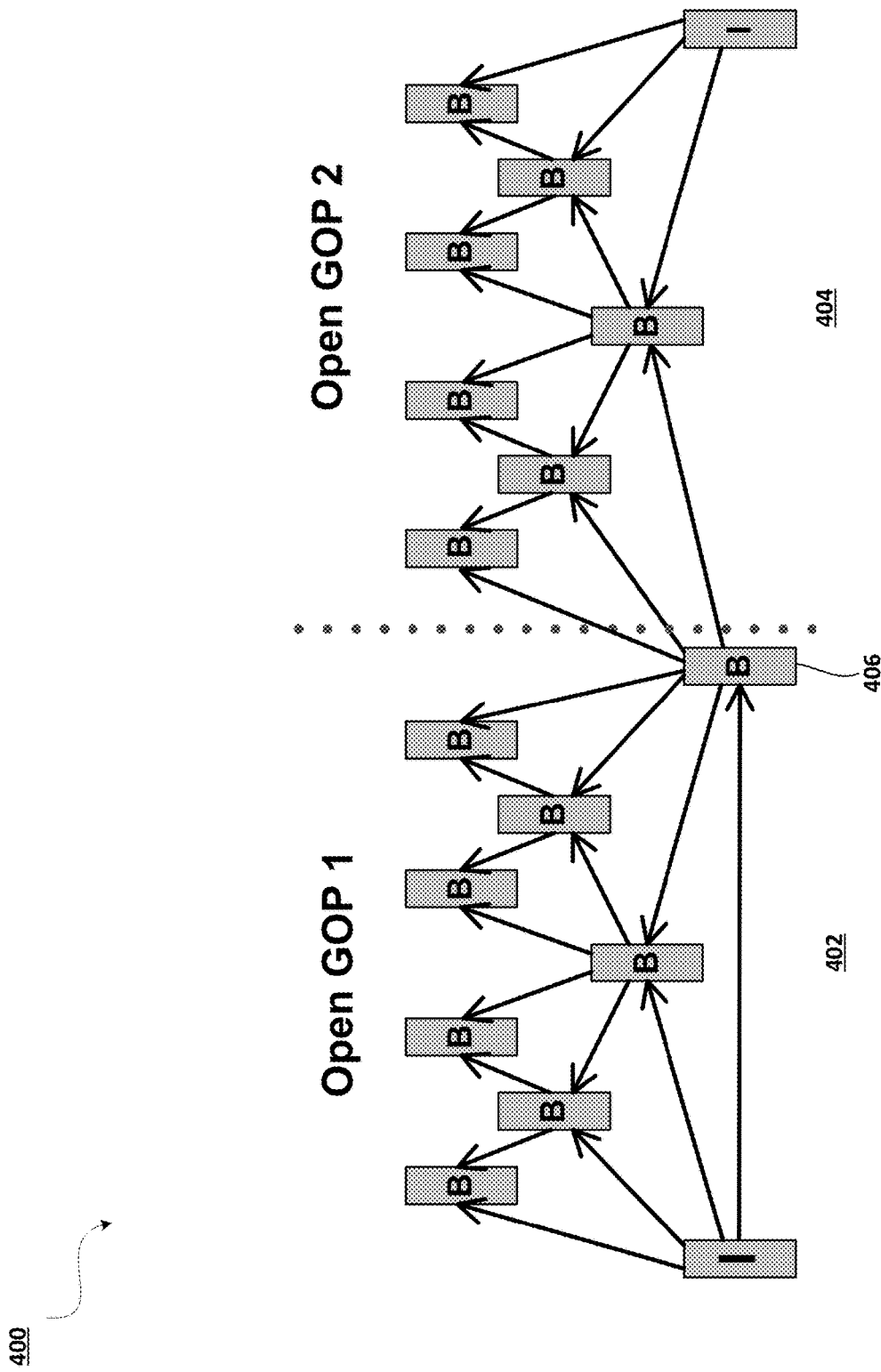
FIG. 4 shows an example set of open GOP structures.

Under the VVC RPR process, frames within one GOP may refer to frames within a previous GOP. FIG. 4 show a set 400 of VVC RPR "open-GOPS." The frames in the GOP 404 may refer to the frames in the GOP 402. For example, several of the B-frames in the GOP 404 refer to the B-frame 406 in the GOP 402. Because these GOPS are "open," conventional B-frames may be used instead of I-frames. As B-frames are more compressed than I-frames, B-frames require less bits to encode than I-frames.

The B-frame referred to by a frame in a later GOP may be a different resolution than the frame in the later GOP. This may be helpful, for example, if there is change in the bandwidth (e.g. the bandwidth drops) and the resolution needs to be lowered. The resolution may be lowered while still referencing frames from previous GOPs, even if those frames had higher resolutions. Similarly, if the resolution needs to be raised, this may be accomplished while still referencing frames from previous GOPs, even if those frames had lower resolutions. As a result, the open-GOPS of VVC increased coding gain.

Figure 5A:
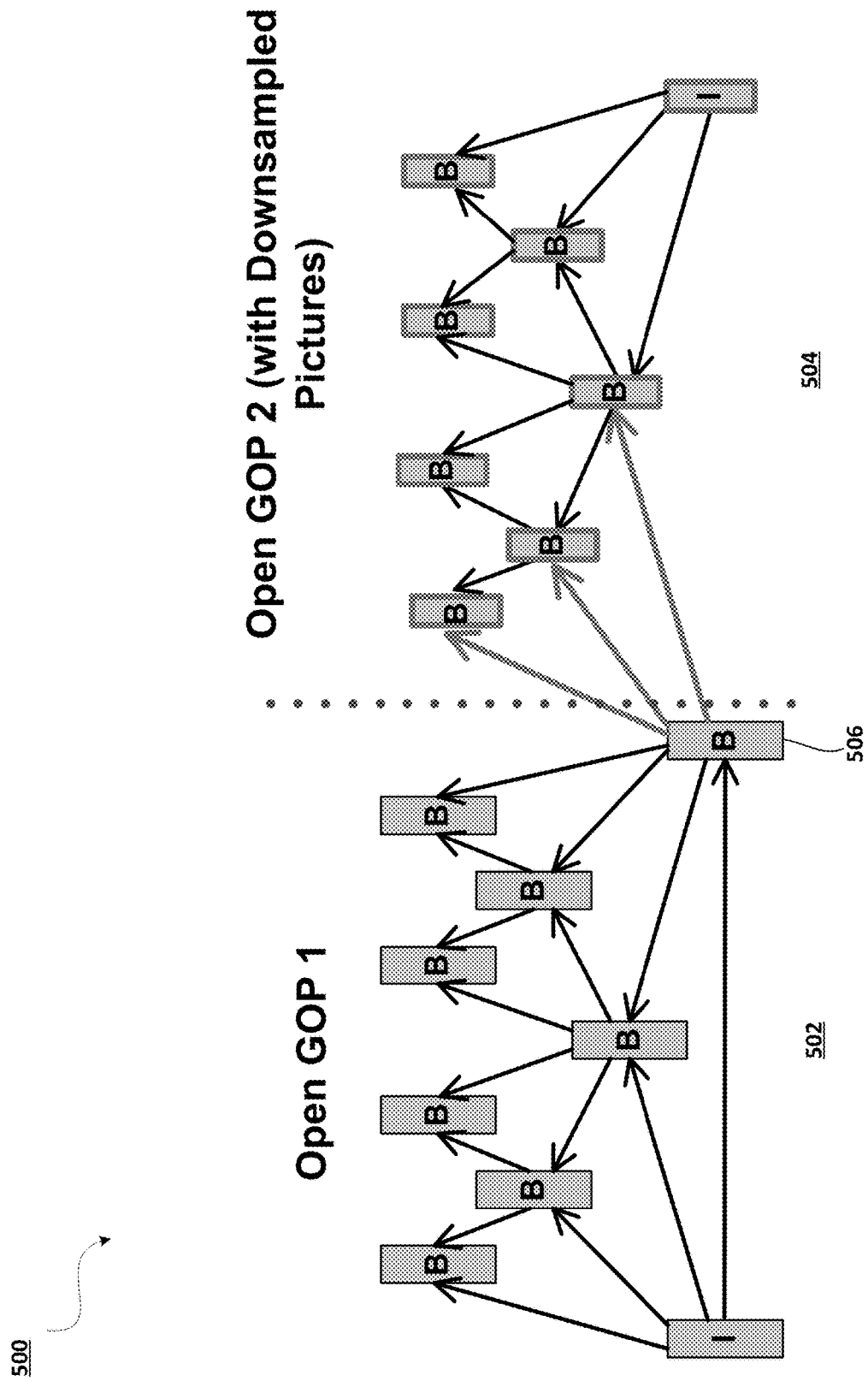
FIG. 5A shows an example set of open GOP structures with down sampling.
Figure 5B:
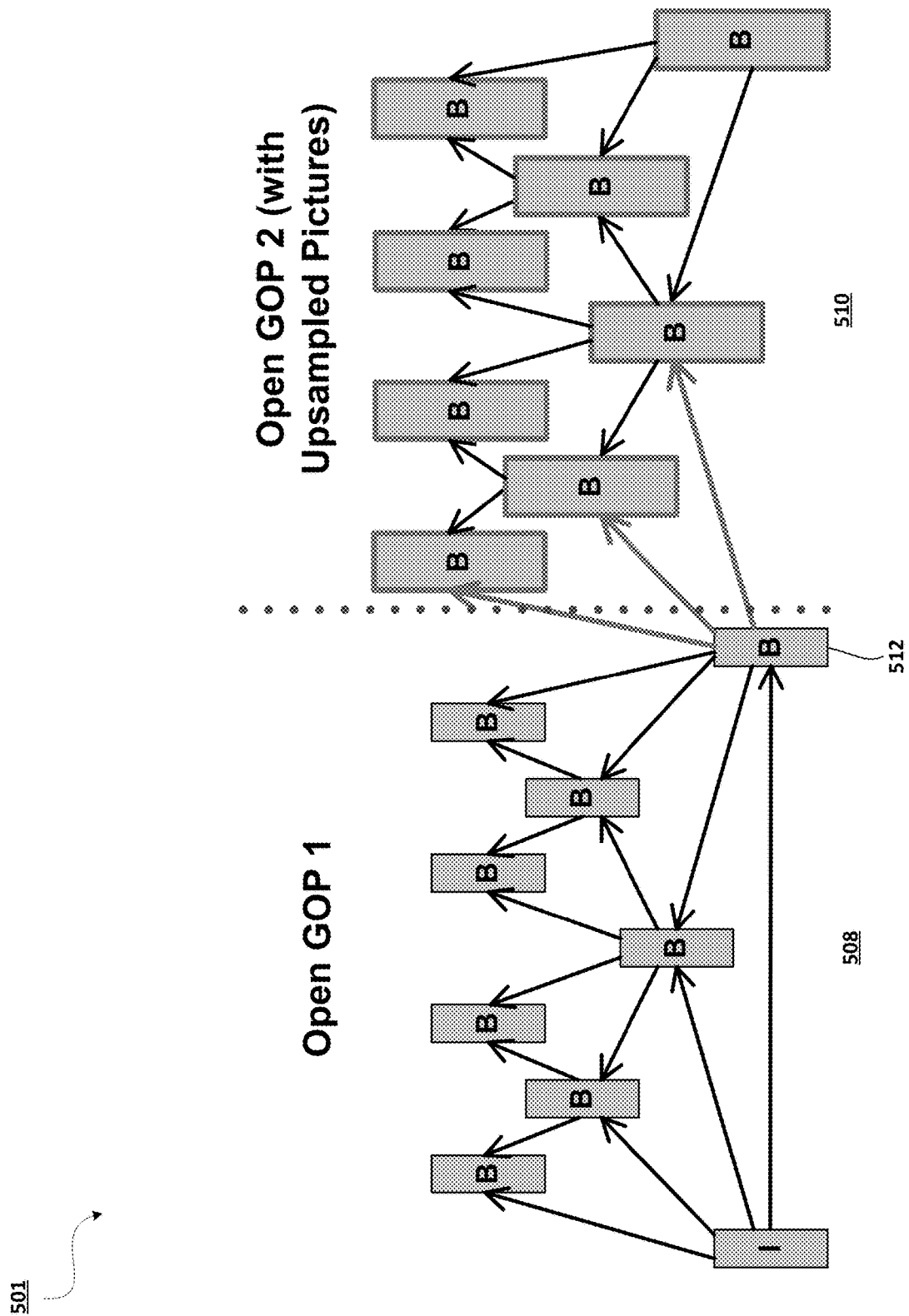
FIG. 5B shows an example set of open GOP structures with up sampling.

FIGS. 5a-b show two sets 500, 501 of "open-GOPS," where the frames in the second GOP are associated with a different resolution than the frames in the first GOP. In FIG. 5a, frames in the GOP 504 have a lower resolution than the frames in the GOP 502. Under VVC, it is still possible for the frames in the GOP 504 to refer to the higher-resolution frames in the GOP 502. For example, several of the B-frames in the GOP 504 refer to the higher-resolution B-frame 506 in the GOP 502. Because the frames in the GOP 504 have a lower resolution than the frames in the GOP 502, the frames in the GOP 504 are "down sampled."

Conversely, in FIG. 5b, frames in the GOP 510 have a higher resolution than the frames in the GOP 508. Under VVC, it is still possible for the frames in the GOP 510 to refer to the lower-resolution frames in the GOP 508. For example, several of the B-frames in the GOP 510 refer to the lower-resolution B-frame 512 in the GOP 508. Because the frames in the GOP 510 have a higher resolution than the frames in the GOP 508, the frames in the GOP 510 are "up sampled."

This VVC RPR technique may be utilized in conjunction with the masking window technique, described above. For example, if the bandwidth drops, it may be determined, such as by the encoder 108, that the frames in a GOP should be encoded with a lower resolution than the frames in a previous GOP. In addition to, or as an alternative to lowering the resolution, it may be determined that the quantization value should be lowered (e.g. a new masking window should begin). If the VVC RPR technique is used in conjunction with the masking window technique (e.g. the resolution is lowered and the quantization value is lowered), the amount that the quantization value is lowered may affect how much the resolution is lowered. These two techniques may be used in parallel to provide optimal visual quality for the change in bitrate.

Figure 6A:
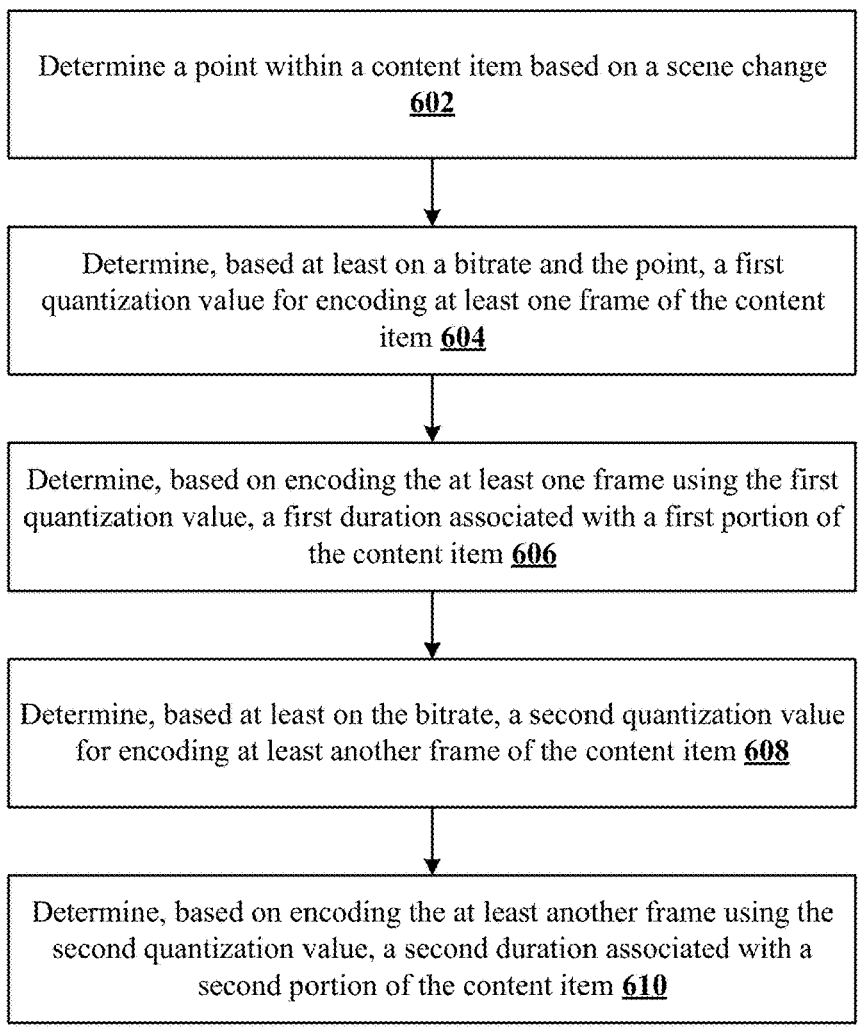
FIG. 6A shows an example method.

FIG. 6A shows an example method 600. The method 600 may be performed, for example, by a masking window module (e.g. the masking window module 104). The method 600 may be performed to compress a content item (e.g. video content). More specifically, the method 600 may be performed to compress a content using joint backward and forward temporal masking. The method 600 may be employed in order to reduce bitrate without perceptibly affecting visual quality (as perceived by the HVS).

As discussed above, content, such as video content, may be separated into many scenes. Each of these scenes may be separated by scene cuts. A scene cut may indicate a change in scene in the video content (e.g. a new frame displaying new content). A particular content item may comprise a large quantity of scene cuts. For example, a scene cut may occur every second or every two seconds (or any other period of time) in a content item. Different types of content may comprise more scene cuts. For example, an action movie may comprise a large number of scene cuts because the camera is continually shifting from side-to-side in order to capture the action. Scene cut(s) in a content item may be determined, for example, using well-known tools. Encoding of the content item may initiated. As encoding proceeds, a scene cut may be detected. At step 602, a point within a content item may be determined. The point may be determined based on a scene cut (e.g. scene change) in the content. For example, the point may occur at the time of a scene cut.

Encoding of the content item may continue. For example, at least one frame of the content item may begin being encoded. The at least one frame of the content item may occur before the point or after the point. At 604, a first quantization value for encoding the at least one frame of the content item may be determined.

For example, to determine the first quantization value for encoding the at least one frame, the cost function J, determined using the Rate-Distortion-Optimization (RDO) process, may be minimized. As discussed above, the value for R in the cost function J may be predetermined. For example, how many bits are allocated for every block in a frame may be predetermined. When encoding a content item, it may be known on which channel the content item is going to be transmitted and/or the desirable size of the content item may be known. Based on this known information a bitrate may be determined. For example, a target bitrate, R, may be identified and/or the bit rate, R, may be estimated. An acceptable level or range of distortion D may be determined. The minimum of D is subject to $R<R_c$, where $R_c$ is a constraint. Accordingly, the minimum of D is related to the predetermined value of R.

As mentioned above, $\lambda$ is a function of the quantization value. The value of $\lambda$ that minimizes the function J may be determined based on the predetermined value of R and the acceptable level or range of distortion D. To find this particular value of $\lambda$ that minimizes the function J, a quantization value that minimizes the function J may be determined. For example, the quantization value that minimizes the function J may be lower than a quantization value that results in the acceptable level or range of distortion D or results in exceeding the acceptable level or range of distortion D. The first quantization value associated with the at least one frame may be the quantization value that is determined to minimize the function J. For example, to determine the first quantization value based on the acceptable level or range of distortion D, a lookup table may be used.

The first quantization value may additionally, or alternatively, be determined based on whether the at least one frame includes a reference frame. As discussed above, a reference frame is a frame which is used as a reference for encoding one or more other frames, e.g. future and/or past (previous) frames, within a given video. A reference frame may be an I-frame, a B-frame, or a P-frame. A non-reference frame may be a B-frame or a P-frame. If too high of an impact is made on a reference frame, the reference frame will comprise artifacts. This will cause the future and/or past (previous) frames that refer to the reference frame to comprise even more artifacts—and this results in poor content quality for the end-viewer. Accordingly, lower quantization values may be determined for reference frame(s) than non-reference frame(s). If the at least one frame includes a plurality of frames, and at least one of the plurality of reference frames is a reference frame and at least one of the plurality of frames is a non-reference frame, then the at least one reference frame may be determined to be associated with a lower quantization value than the at least one non-reference frame. Accordingly, the first quantization value may be substantially the same for each of the plurality of frames but may differ (slightly or substantially) for the reference frame(s).

The at least one frame may be encoded using the first quantization value. It may then be determined how many additional frames can be encoded using the first quantization value without being detectable by the HVS. At 606, a first duration associated with a first portion of the content item may be determined. The first duration may be indicated by the quantity of frames that can be encoded using the first quantization value without being detectable by the HVS. The first portion may be, for example, a first masking window (e.g. either a forward masking window or a backward masking window). The first portion may comprise the at least one frame being encoded using the first quantization value. If the first portion occurs after the point determined at 602, the first portion may be a forward masking window. If the first portion occurs before the point determined at 602, the first portion may be a backward masking window.

To determine the quantity of frames that may be encoded using the first quantization value without being detectable by the HVS (e.g. the duration of the first portion), a subjective distortion level associated with encoding the content item may be monitored, in a closed loop, during encoding. For example, the subjective distortion level associated with each coding block of the encoded content item may be monitored. Eventually, during encoding, the subjective distortion level may fail to satisfy a predetermined distortion threshold. As discussed above, the predetermined distortion threshold may be the acceptable level or range of distortion D, defined by the cost function J. Additionally, or alternatively, the predetermined distortion threshold may be a predefined Just Noticeable Difference (JND) threshold that represents the visibility of the Human Visual System (HVS). Subjective distortion may increase due to increased visibility (by the HVS) of artifacts. Subjective distortion may decrease due to reduced visibility (by the HVS) of artifacts.

For example, if the first portion is a forward masking window, the subjective distortion level may begin to increase as the frame(s) of the content item that are further away from the scene cut begin to be encoded. The subjective distortion level may fail to satisfy the predetermined distortion threshold if it exceeds the predetermined distortion threshold. Conversely, if the first portion is a backward masking window and the frames are being encoded in display order, the subjective distortion level may begin to decrease as the frame(s) of the content item that are closer to the scene cut begin to be encoded. If the first portion is a backward masking window and the frames are being encoded in reverse of display order, the subjective distortion level may begin to increase as the frame(s) of the content item that are further away from the scene cut begin to be encoded. The subjective distortion level may fail to satisfy the predetermined distortion threshold if it falls below the predetermined distortion threshold (e.g. below an acceptable range of distortion).

If the subjective distortion level eventually fails to satisfy a predetermined distortion threshold, it may be determined that the first portion needs to be terminated at that time. For example, it may be determined that the first masking window needs to be terminated. If it is determined that the first portion needs to be terminated, encoding of the content item may continue, but with a different quantization value than the first quantization value.

Encoding of the content item may continue. For example, at least another frame of the content item may begin being encoded. The at least another frame may be different than the at least one frame. For example, the at least another frame may not be part of the first portion. The at least another frame of the content item may occur after the at least one frame of the content item. At 608, a second quantization value for encoding the at least another frame of the content item may be determined.

The second quantization value may be determined in a similar manner to how the first quantization value is determined at step 604. For example, to determine the second quantization value for encoding the at least another frame, the cost function J may be minimized. The second quantization value may additionally, or alternatively, be determined based on whether the at least another frame includes a reference frame. If the at least another frame includes a plurality of frames, and at least one of the plurality of reference frames is a reference frame and at least one of the plurality of frames is a non-reference frame, then the at least one reference frame may be determined to be associated with a lower quantization value than the at least one non-reference frame. Accordingly, the second quantization value may be substantially the same for each of the plurality of frames but may differ (slightly or substantially) for the reference frame(s).

If the first portion is a forward masking window (e.g. after the scene cut), then the second quantization value may be lower than the first quantization value. This is because, as discussed above, the HVS may notice a scene cut but may not notice what occurred immediately before or after the scene cut. Accordingly, the further-in-time away from the scene cut a portion of the content is, the more noticeable artifacts may be. As a higher quantization value results in a larger number of artifacts, the second quantization value may lower than the first quantization value because the at least another frame occurs further away from the scene cut than the first portion does.

Conversely, if the first portion is a backward masking window (e.g. before the scene cut) and the frames are being encoded in display order, then the second quantization value may be higher than the first quantization value. As a higher quantization value results in a larger number of artifacts, the second quantization value may higher than the first quantization value because the at least another frame occurs closer to the scene cut than the first portion does. If the first portion is a backward masking window (e.g. before the scene cut) and the frames are being encoded in reverse of display order, then the second quantization value may be lower than the first quantization value. As a higher quantization value results in a larger number of artifacts, the second quantization value may lower than the first quantization value because the at least another frame occurs further in time from the scene cut than the first portion does.

The at least another frame may be encoded using the second quantization value. It may then be determined how many additional frames can be encoded using the second quantization value without being detectable by the HVS. At 610, a second duration associated with a second portion of the content item may be determined. The second duration may be indicated by the quantity of frames that can be encoded using the second quantization value without being detectable by the HVS. The second portion may be, for example, a second masking window (e.g. either a forward masking window or a backward masking window). The second portion may comprise the at least another frame being encoded using the second quantization value. If the first portion occurs after the point determined at 602, the first portion may be another, subsequent forward masking window. If the first portion occurs before the point determined at 602, the first portion may be a backward masking window and the second portion may be another backward masking window.

The quantity of frames in the second portion may be determined in a similar manner to how the quantity of frames in the first portion is determined at step 606. To determine the quantity of frames that may be encoded using the second quantization value without being detectable by the HVS (e.g. the duration of the second portion), a subjective distortion level associated with encoding the content item may be monitored, in a closed loop, during encoding. If the subjective distortion level eventually fails to satisfy a predetermined distortion threshold, it may be determined that the second portion needs to be terminated at that time. For example, it may be determined that the second masking window needs to be terminated. If it is determined that the second portion needs to be terminated, encoding of the content item may continue, but with a different quantization value than the second quantization value.

Any number of portions (e.g. masking windows), each associated with a particular quantization value, may be used between scene cuts. The different quantization values associated with each portion may cause each portion to be associated with a different content quality level. As discussed above, the duration of portion(s) associated with a large quantization value may be shorter than the duration of portion(s) associated with a smaller quantization value. This may be because the subjective distortion that results from using a larger quantization value becomes more noticeable to the HVS, more quickly.

The method 600 may be used in conjunction with the VVC RPR technique, discussed above. For example, when encoding the content item, if the bandwidth drops, it may be determined a new portion (e.g. new masking window) associated with a lower quantization value should begin. Additionally, or alternatively, to address the drop in bandwidth, it may be determined that the frames in a GOP should be encoded with a lower resolution than the frames in a previous GOP. For example, the resolution may be lowered and the quantization value may be lowered. The amount that the quantization value is lowered may affect how much the resolution is lowered (and vice versa). These two techniques may be utilized, such as by an encoder, in parallel to provide optimal visual quality for the change in bitrate.

Figure 6B:
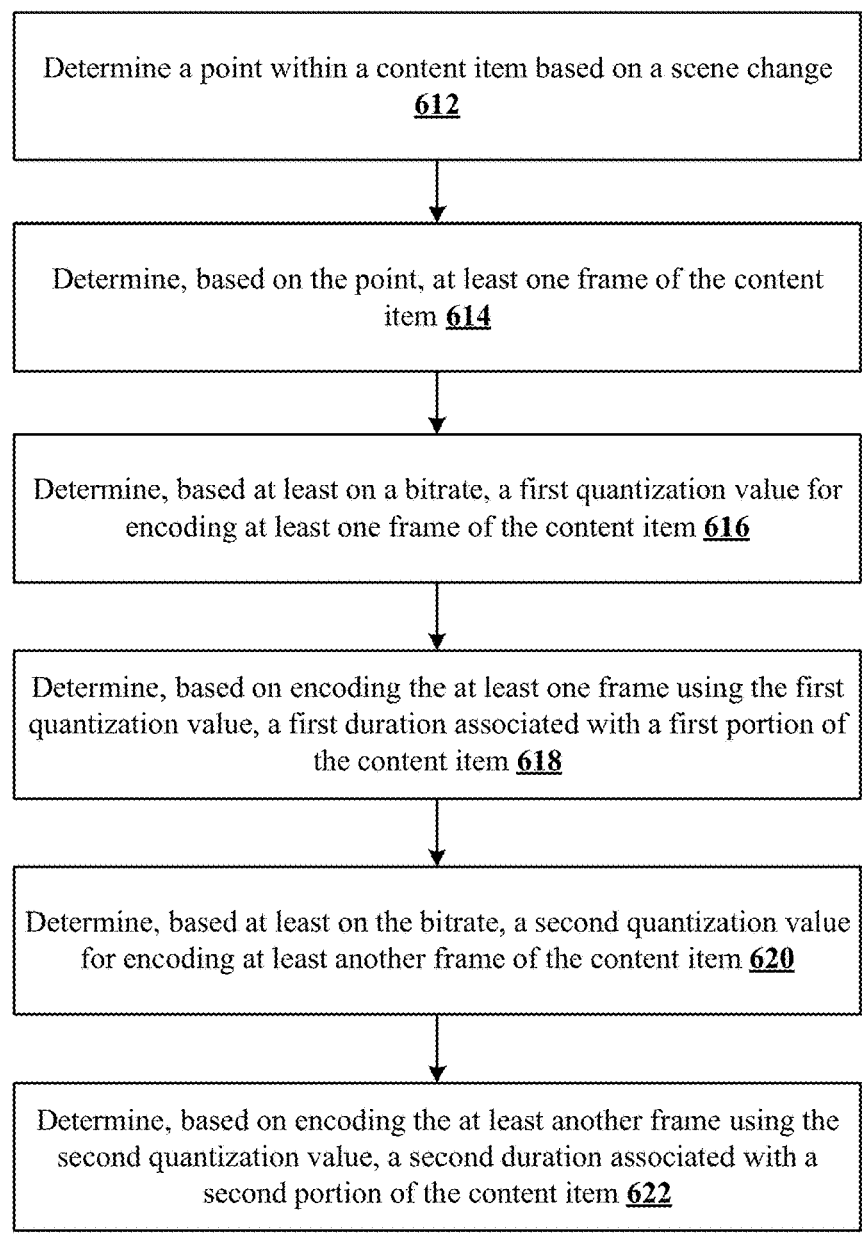
FIG. 6B shows an example method.

FIG. 6B shows an example method 601. The method 601 may be performed, for example, by a masking window module (e.g. the masking window module 104). The method 601 may be performed to compress a content item (e.g. video content). More specifically, the method 601 may be performed to compress a content using joint backward and forward temporal masking. The method 601 may be employed in order to reduce bitrate without perceptibly affecting visual quality (as perceived by the HVS).

As discussed above, content, such as video content, may be separated into many scenes. Each of these scenes may be separated by scene cuts. A scene cut may indicate a change in scene in the video content (e.g. a new frame displaying new content). A particular content item may comprise a large quantity of scene cuts. For example, a scene cut may occur every second or every two seconds (or any other period of time) in a content item. Different types of content may comprise more scene cuts. For example, an action movie may comprise a large number of scene cuts because the camera is continually shifting from side-to-side in order to capture the action. Scene cut(s) in a content item may be determined, for example, using well-known tools. Encoding of the content item may initiated. As encoding proceeds, a scene cut may be detected. At 612, a point within a content item may be determined. The point may be determined based on a scene cut (e.g. scene change) in the content. For example, the point may occur at the time of a scene cut.

At 614, at least one frame of the content item may be determined based at least on the point. The at least one frame of the content item may occur before the point or after the point. Encoding of the content item may continue. For example, the at least one frame of the content item may begin being encoded. At 616, a first quantization value for encoding the at least one frame of the content item may be determined.

For example, to determine the first quantization value for encoding the at least one frame, the cost function J, determined using the Rate-Distortion-Optimization (RDO) process, may be minimized. As discussed above, the value for R in the cost function J may be predetermined. For example, how many bits are allocated for every block in a frame may be predetermined. When encoding a content item, it may be known on which channel the content item is going to be transmitted and/or the desirable size of the content item may be known. Based on this known information a bitrate may be determined. For example, a target bitrate, R, may be identified and/or the bit rate, R, may be estimated. An acceptable level or range of distortion D may be determined. The minimum of D is subject to $R<R_c$, where $R_c$ is a constraint. Accordingly, the minimum of D is related to the predetermined value of R.

As mentioned above, $\lambda$ is a function of the quantization value. The value of $\lambda$ that minimizes the function J may be determined based on the predetermined value of R and the acceptable level or range of distortion D. To find this particular value of $\lambda$ that minimizes the function J, a quantization value that minimizes the function J may be determined. For example, the quantization value that minimizes the function J may be lower than a quantization value that results in the acceptable level or range of distortion D or results in exceeding the acceptable level or range of distortion D. The first quantization value associated with the at least one frame may be the quantization value that is determined to minimize the function J. For example, to determine the first quantization value based on the acceptable level or range of distortion D, a lookup table may be used.

The first quantization value may additionally, or alternatively, be determined based on whether the at least one frame includes a reference frame. As discussed above, a reference frame is a frame which is used as a reference for encoding one or more other frames, e.g. future and/or past (previous) frames, within a given video. A reference frame may be an I-frame, a B-frame, or a P-frame. A non-reference frame may be a B-frame or a P-frame. If too high of an impact is made on a reference frame, the reference frame will comprise artifacts. This will cause the future and/or past (previous) frames that refer to the reference frame to comprise even more artifacts—and this results in poor content quality for the end-viewer. Accordingly, lower quantization values may be determined for reference frame(s) than non-reference frame(s). If the at least one frame includes a plurality of frames, and at least one of the plurality of reference frames is a reference frame and at least one of the plurality of frames is a non-reference frame, then the at least one reference frame may be determined to be associated with a lower quantization value than the at least one non-reference frame. Accordingly, the first quantization value may be substantially the same for each of the plurality of frames but may differ (slightly or substantially) for the reference frame(s).

The at least one frame may be encoded using the first quantization value. It may then be determined how many additional frames can be encoded using the first quantization value without being detectable by the HVS. At 618, a first duration associated with a first portion of the content item may be determined. The first duration may be indicated by the quantity of frames that can be encoded using the first quantization value without being detectable by the HVS. The first portion may be, for example, a first masking window (e.g. either a forward masking window or a backward masking window). The first portion may comprise the at least one frame being encoded using the first quantization value. If the first portion occurs after the point determined at 612, the first portion may be a forward masking window. If the first portion occurs before the point determined at 612, the first portion may be a backward masking window.

To determine the quantity of frames that may be encoded using the first quantization value without being detectable by the HVS (e.g. the duration of the first portion), a subjective distortion level associated with encoding the content item may be monitored, in a closed loop, during encoding. For example, the subjective distortion level associated with each coding block of the encoded content item may be monitored. Eventually, during encoding, the subjective distortion level may fail to satisfy a predetermined distortion threshold. As discussed above, the predetermined distortion threshold may be the acceptable level or range of distortion D, defined by the cost function J. Additionally, or alternatively, the predetermined distortion threshold may be a predefined Just Noticeable Difference (JND) threshold that represents the visibility of the Human Visual System (HVS). Subjective distortion may increase due to increased visibility (by the HVS) of artifacts. Subjective distortion may decrease due to reduced visibility (by the HVS) of artifacts.

For example, if the first portion is a forward masking window, the subjective distortion level may begin to increase as the frame(s) of the content item that are further away from the scene cut begin to be encoded. The subjective distortion level may fail to satisfy the predetermined distortion threshold if it exceeds the predetermined distortion threshold. Conversely, if the first portion is a backward masking window and the frames are being encoded in display order, the subjective distortion level may begin to decrease as the frame(s) of the content item that are closer to the scene cut begin to be encoded. If the first portion is a backward masking window and the frames are being encoded in reverse of display order, the subjective distortion level may begin to increase as the frame(s) of the content item that are further away from the scene cut begin to be encoded. The subjective distortion level may fail to satisfy the predetermined distortion threshold if it falls below the predetermined distortion threshold (e.g. below an acceptable range of distortion).

If the subjective distortion level eventually fails to satisfy a predetermined distortion threshold, it may be determined that the first portion needs to be terminated at that time. For example, it may be determined that the first masking window needs to be terminated. If it is determined that the first portion needs to be terminated, encoding of the content item may continue, but with a different quantization value than the first quantization value.

Encoding of the content item may continue. For example, at least another frame of the content item may begin being encoded. The at least another frame may be different than the at least one frame. For example, the at least another frame may not be part of the first portion. The at least another frame of the content item may occur after the at least one frame of the content item. At 620, a second quantization value for encoding the at least another frame of the content item may be determined.

The second quantization value may be determined in a similar manner to how the first quantization value is determined at step 616. For example, to determine the second quantization value for encoding the at least another frame, the cost function J may be minimized. The second quantization value may additionally, or alternatively, be determined based on whether the at least another frame includes a reference frame. If the at least another frame includes a plurality of frames, and at least one of the plurality of reference frames is a reference frame and at least one of the plurality of frames is a non-reference frame, then the at least one reference frame may be determined to be associated with a lower quantization value than the at least one non-reference frame. Accordingly, the second quantization value may be substantially the same for each of the plurality of frames but may differ (slightly or substantially) for the reference frame(s).

If the first portion is a forward masking window (e.g. after the scene cut), then the second quantization value may be lower than the first quantization value. This is because, as discussed above, the HVS may notice a scene cut but may not notice what occurred immediately before or after the scene cut. Accordingly, the further-in-time away from the scene cut a portion of the content is, the more noticeable artifacts may be. As a higher quantization value results in a larger number of artifacts, the second quantization value may lower than the first quantization value because the at least another frame occurs further away from the scene cut than the first portion does.

Conversely, if the first portion is a backward masking window (e.g. before the scene cut) and the frames are being encoded in display order, then the second quantization value may be higher than the first quantization value. As a higher quantization value results in a larger number of artifacts, the second quantization value may higher than the first quantization value because the at least another frame occurs closer to the scene cut than the first portion does. If the first portion is a backward masking window (e.g. before the scene cut) and the frames are being encoded in reverse of display order, then the second quantization value may be lower than the first quantization value. As a higher quantization value results in a larger number of artifacts, the second quantization value may lower than the first quantization value because the at least another frame occurs further in time from the scene cut than the first portion does.

The at least another frame may be encoded using the second quantization value. It may then be determined how many additional frames can be encoded using the second quantization value without being detectable by the HVS. At 622, a second duration associated with a second portion of the content item may be determined. The second duration may be indicated by the quantity of frames that can be encoded using the second quantization value without being detectable by the HVS. The second portion may be, for example, a second masking window (e.g. either a forward masking window or a backward masking window). The second portion may comprise the at least another frame being encoded using the second quantization value. If the first portion occurs after the point determined at 612, the first portion may be another, subsequent forward masking window. If the first portion occurs before the point determined at 612, the first portion may be a backward masking window and the second portion may be another backward masking window.

The quantity of frames in the second portion may be determined in a similar manner to how the quantity of frames in the first portion is determined at step 618. To determine the quantity of frames that may be encoded using the second quantization value without being detectable by the HVS (e.g. the duration of the second portion), a subjective distortion level associated with encoding the content item may be monitored, in a closed loop, during encoding. If the subjective distortion level eventually fails to satisfy a predetermined distortion threshold, it may be determined that the second portion needs to be terminated at that time. For example, it may be determined that the second masking window needs to be terminated. If it is determined that the second portion needs to be terminated, encoding of the content item may continue, but with a different quantization value than the second quantization value.

Any number of portions (e.g. masking windows), each associated with a particular quantization value, may be used between scene cuts. The different quantization values associated with each portion may cause each portion to be associated with a different content quality level. As discussed above, the duration of portion(s) associated with a large quantization value may be shorter than the duration of portion(s) associated with a smaller quantization value. This may be because the subjective distortion that results from using a larger quantization value becomes more noticeable to the HVS, more quickly.

The method 601 may be used in conjunction with the VVC RPR technique, discussed above. For example, when encoding the content item, if the bandwidth drops, it may be determined a new portion (e.g. new masking window) associated with a lower quantization value should begin. Additionally, or alternatively, to address the drop in bandwidth, it may be determined that the frames in a GOP should be encoded with a lower resolution than the frames in a previous GOP. For example, the resolution may be lowered and the quantization value may be lowered. The amount that the quantization value is lowered may affect how much the resolution is lowered (and vice versa). These two techniques may be utilized, such as by an encoder, in parallel to provide optimal visual quality for the change in bitrate.

Figure 7A:
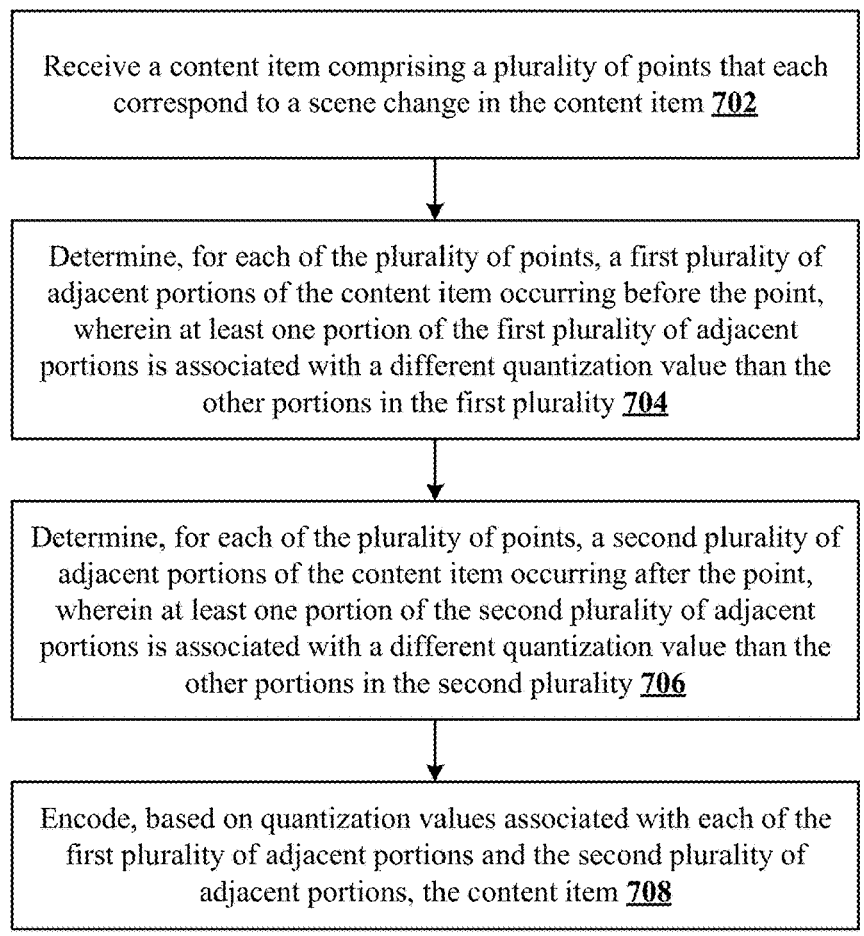
FIG. 7A shows an example method.

FIG. 7A shows an example method 700. The method 700 may be performed, for example, by a masking window module (e.g. the masking window module 104). The method 700 may be performed to compress a content item (e.g. video content). More specifically, the method 700 may be performed to compress a content using joint backward and forward temporal masking. The method 700 may be employed in order to reduce bitrate without perceptibly affecting visual quality (as perceived by the HVS).

As discussed above, content, such as video content, may be separated into many scenes. Each of these scenes may be separated by scene cuts. A scene cut may indicate a change in scene in the video content (e.g. a new frame displaying new content). A particular content item may comprise a large quantity of scene cuts. For example, a scene cut may occur every second or every two seconds (or any other period of time) in a content item. Different types of content may comprise more scene cuts. For example, an action movie may comprise a large number of scene cuts because the camera is continually shifting from side-to-side in order to capture the action. Scene cut(s) in a content item may be determined, for example, using well-known tools. At step 702, a content item may be received. The content item may comprise a plurality of points that each correspond to a scene cut (e.g. scene change) in the content item. For example, if the content item comprises a large quantity of scene cuts, the content item may comprise a large number of points that each correspond to one of the scene cuts.

A plurality of backward masking windows may be determined for each point. At 704, for each of the plurality of points, a first plurality of adjacent portions (e.g. adjacent backward masking windows) of the content item occurring before the point may be determined. Each portion of the first plurality of adjacent portions may be associated with a different quantization value than the other portions in the first plurality. For example, the portions furthest-in-time from the point may be associated with the lowest quantization values and the portions closest-in-time to the point may be associated with the highest quantization values. Any number of portions (e.g. masking windows) may be included in the first plurality of portions. As each portion in the first plurality of portions is associated with a different quantization value, each portion the first plurality of portions may be associated with a different content quality level.

A plurality of forward masking windows may be determined for each point. At 706, for each of the plurality of points, a second plurality of adjacent portions (e.g. adjacent forward masking windows) of the content item occurring after the point may be determined. Each portion of the second plurality of adjacent portions may be associated with a different quantization value than the other portions in the second plurality. For example, the portions furthest-in-time from the point may be associated with the lowest quantization values and the portions closest-in-time to the point may be associated with the highest quantization values. Any number of portions (e.g. masking windows) may be included in the second plurality of portions. As each portion in the second plurality of portions is associated with a different quantization value, each portion the second plurality of portions may be associated with a different content quality level.

The content item may be encoded. At 708, the content item may be encoded based on quantization values associated with each backward masking window of the plurality of backward masking windows and quantization values associated with each forward masking window of the plurality of forward masking windows. For example, each masking window (forward and backward) may be encoded using the respective quantization value associated with that window. The quantization values associated with each forward and backward masking window may be determined in the manner(s) described above.

The method 700 may be used in conjunction with the VVC RPR technique, discussed above. For example, when encoding the content item, if the bandwidth drops, it may be determined a new portion (e.g. new masking window) associated with a lower quantization value should begin. Additionally, or alternatively, to address the drop in bandwidth, it may be determined that the frames in a GOP should be encoded with a lower resolution than the frames in a previous GOP. For example, the resolution may be lowered and the quantization value may be lowered. The amount that the quantization value is lowered may affect how much the resolution is lowered (and vice versa). These two techniques may be utilized, such as by an encoder, in parallel to provide optimal visual quality for the change in bitrate.

Figure 7B:
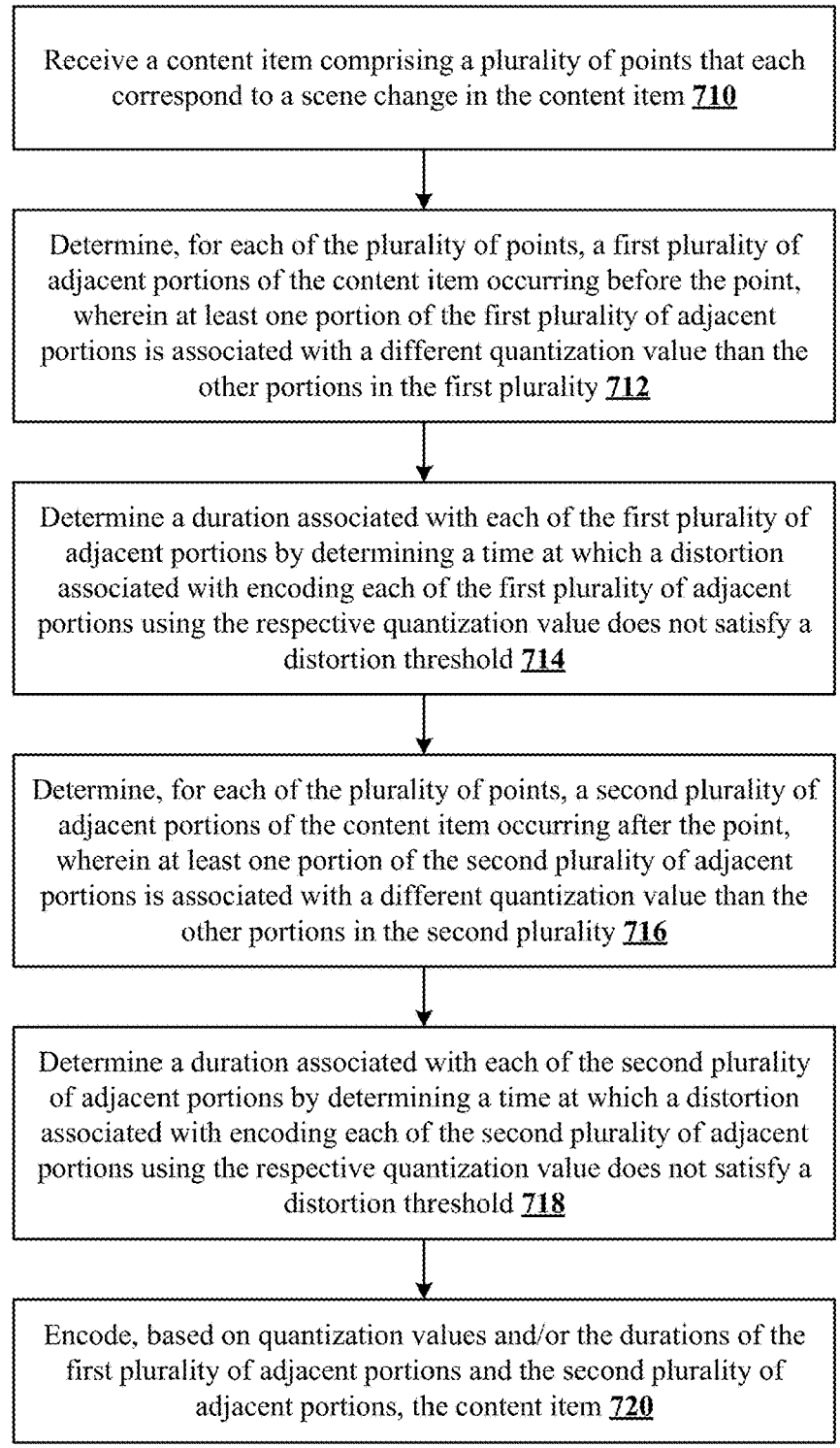
FIG. 7B shows an example method.

FIG. 7B shows an example method 701. The method 701 may be performed, for example, by a masking window module (e.g. the masking window module 104). The method 701 may be performed to compress a content item (e.g. video content). More specifically, the method 701 may be performed to compress a content using joint backward and forward temporal masking. The method 701 may be employed in order to reduce bitrate without perceptibly affecting visual quality (as perceived by the HVS).

As discussed above, content, such as video content, may be separated into many scenes. Each of these scenes may be separated by scene cuts. A scene cut may indicate a change in scene in the video content (e.g. a new frame displaying new content). A particular content item may comprise a large quantity of scene cuts. For example, a scene cut may occur every second or every two seconds (or any other period of time) in a content item. Different types of content may comprise more scene cuts. For example, an action movie may comprise a large number of scene cuts because the camera is continually shifting from side-to-side in order to capture the action. Scene cut(s) in a content item may be determined, for example, using well-known tools. At step 710, a content item may be received. The content item may comprise a plurality of points that each correspond to a scene cut (e.g. scene change) in the content item. For example, if the content item comprises a large quantity of scene cuts, the content item may comprise a large number of points that each correspond to one of the scene cuts.

A plurality of backward masking windows may be determined for each point. At 712, for each of the plurality of points, a first plurality of adjacent portions (e.g. adjacent backward masking windows) of the content item occurring before the point may be determined. Each portion of the first plurality of adjacent portions may be associated with a different quantization value than the other portions in the first plurality. For example, the portions furthest-in-time from the point may be associated with the lowest quantization values and the portions closest-in-time to the point may be associated with the highest quantization values. Any number of portions (e.g. masking windows) may be included in the first plurality of portions. As each portion in the first plurality of portions is associated with a different quantization value, each portion the first plurality of portions may be associated with a different content quality level.

At 714, the duration of each of the plurality of backward masking windows may be determined. The duration of each of the plurality of backward masking windows may be the quantity of frames included in that particular backward masking window. To determine the quantity of frames that may be included in a particular backward masking window, it may be determined how many frames may be encoded using the respective quantization value associated with that window without being detectable by the HVS. For example, a subjective distortion level associated with encoding the content item may be monitored, in a closed loop, during encoding. If the subjective distortion level eventually fails to satisfy a predetermined distortion threshold, it may be determined that the backward masking window needs to be terminated. As discussed above, the predetermined distortion threshold may be the acceptable level or range of distortion D, defined by the cost function J. Additionally, or alternatively, the predetermined distortion threshold may be a predefined Just Noticeable Difference (JND) threshold that represents the visibility of the Human Visual System (HVS).

Generally, the duration of the backward masking windows in the plurality of backward masking windows associated with a large quantization value (e.g. those portions closest to the point) may be shorter than the duration of backward masking windows in the plurality of backward masking window associated with a smaller quantization value. This may be because the subjective distortion that results from using a larger quantization value becomes more noticeable to the HVS, more quickly.

A plurality of forward masking windows may be determined for each point. At 716, for each of the plurality of points, a second plurality of adjacent portions (e.g. adjacent forward masking windows) of the content item occurring after the point may be determined. Each portion of the second plurality of adjacent portions may be associated with a different quantization value than the other portions in the second plurality. For example, the portions furthest-in-time from the point may be associated with the lowest quantization values and the portions closest-in-time to the point may be associated with the highest quantization values. Any number of portions (e.g. masking windows) may be included in the second plurality of portions. As each portion in the second plurality of portions is associated with a different quantization value, each portion the second plurality of portions may be associated with a different content quality level.

At 718, the duration of each of the plurality of forward masking windows may be determined. The duration of each of the plurality of forward masking windows may be the quantity of frames included in that particular forward masking window. To determine the quantity of frames that may be included in a particular forward masking window, it may be determined how many frames may be encoded using the respective quantization value associated with that window without being detectable by the HVS. For example, a subjective distortion level associated with encoding the content item may be monitored, in a closed loop, during encoding. If the subjective distortion level eventually fails to satisfy a predetermined distortion threshold, it may be determined that the forward masking window needs to be terminated. As discussed above, the predetermined distortion threshold may be the acceptable level or range of distortion D, defined by the cost function J. Additionally, or alternatively, the predetermined distortion threshold may be a predefined Just Noticeable Difference (JND) threshold that represents the visibility of the Human Visual System (HVS).

Generally, the duration of the forward masking windows in the plurality of forward masking windows associated with a large quantization value (e.g. those portions closest to the point) may be shorter than the duration of forward masking windows in the plurality of forward masking window associated with a smaller quantization value. This may be because the subjective distortion that results from using a larger quantization value becomes more noticeable to the HVS, more quickly.

The content item may be encoded. At 720, the content item may be encoded based on quantization values and/or the durations associated with each backward masking window of the plurality of backward masking windows and quantization values and/or the durations associated with each forward masking window of the plurality of forward masking windows. For example, each masking window (forward and backward) may be encoded using the respective quantization value associated with that window. The quantization values associated with each forward and backward masking window may be determined in the manner(s) described above.

The method 701 may be used in conjunction with the VVC RPR technique, discussed above. For example, when encoding the content item, if the bandwidth drops, it may be determined a new portion (e.g. new masking window) associated with a lower quantization value should begin. Additionally, or alternatively, to address the drop in bandwidth, it may be determined that the frames in a GOP should be encoded with a lower resolution than the frames in a previous GOP. For example, the resolution may be lowered and the quantization value may be lowered. The amount that the quantization value is lowered may affect how much the resolution is lowered (and vice versa). These two techniques may be utilized, such as by an encoder, in parallel to provide optimal visual quality for the change in bitrate.

Figure 8:
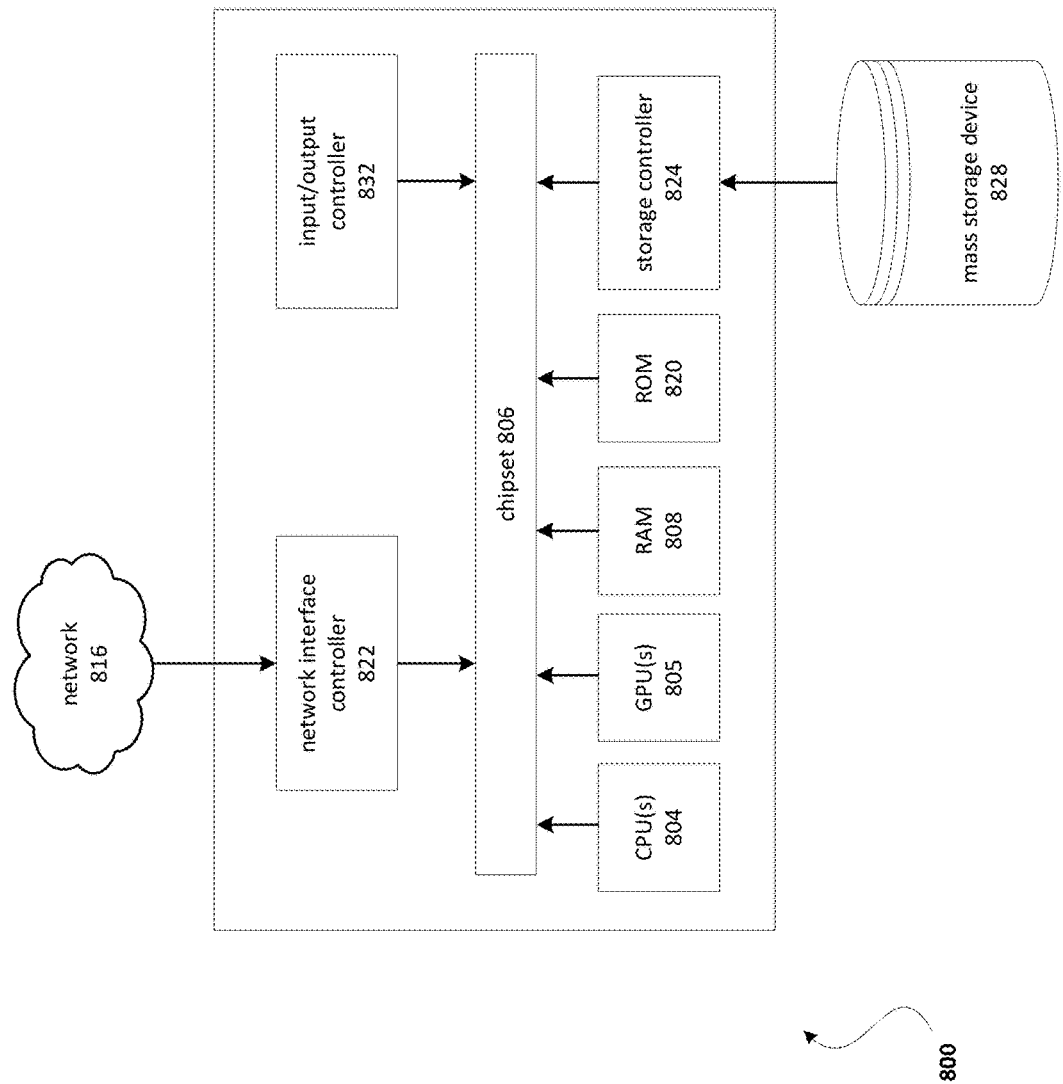
FIG. 8 shows an example computing device.

FIG. 8 depicts a computing device 800 that may be used in various aspects, such as the servers, modules, and/or devices depicted in FIG. 1. With regard to the example architecture of FIG. 1, the, server 102, the device 110, the masking window module, and/or the encoder 108 may each be implemented in an instance of a computing device 800 of FIG. 8. The computer architecture shown in FIG. 8 shows a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIGS. 6-7.

The computing device 800 may include a baseboard, or "motherboard," which is a printed circuit board to which a multitude of components or devices may be connected by way of a system bus or other electrical communication paths. One or more central processing units (CPUs) 804 may operate in conjunction with a chipset 806. The CPU(s) 804 may be standard programmable processors that perform arithmetic and logical operations necessary for the operation of the computing device 800.

The CPU(s) 804 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 804 may be augmented with or replaced by other processing units, such as GPU(s) 805. The GPU(s) 805 may comprise processing units specialized for but not necessarily limited to highly parallel computations, such as graphics and other visualization-related processing.

A chipset 806 may provide an interface between the CPU(s) 804 and the remainder of the components and devices on the baseboard. The chipset 806 may provide an interface to a random access memory (RAM) 808 used as the main memory in the computing device 800. The chipset 806 may provide an interface to a computer-readable storage medium, such as a read-only memory (ROM) 820 or non-volatile RAM (NVRAM) (not shown), for storing basic routines that may help to start up the computing device 800 and to transfer information between the various components and devices. ROM 820 or NVRAM may also store other software components necessary for the operation of the computing device 800 in accordance with the aspects described herein.

The computing device 800 may operate in a networked environment using logical connections to remote computing nodes and computer systems through local area network (LAN) 816. The chipset 806 may include functionality for providing network connectivity through a network interface controller (NIC) 822, such as a gigabit Ethernet adapter. A NIC 822 may be capable of connecting the computing device 800 to other computing nodes over a network 816. It should be appreciated that multiple NICs 822 may be present in the computing device 800, connecting the computing device to other types of networks and remote computer systems.

The computing device 800 may be connected to a mass storage device 828 that provides non-volatile storage for the computer. The mass storage device 828 may store system programs, application programs, other program modules, and data, which have been described in greater detail herein. The mass storage device 828 may be connected to the computing device 800 through a storage controller 824 connected to the chipset 806. The mass storage device 828 may consist of one or more physical storage units. A storage controller 824 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 800 may store data on a mass storage device 828 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 828 is characterized as primary or secondary storage and the like.

For example, the computing device 800 may store information to the mass storage device 828 by issuing instructions through a storage controller 824 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 800 may read information from the mass storage device 828 by detecting the physical states or characteristics of one or more particular locations within the physical storage units.

In addition to the mass storage device 828 described herein, the computing device 800 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 800.

By way of example and not limitation, computer-readable storage media may include volatile and non-volatile, transitory computer-readable storage media and non-transitory computer-readable storage media, and removable and non-removable media implemented in any method or technology. However, as used herein, the term computer-readable storage media does not encompass transitory computer-readable storage media, such as signals. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 828 depicted in FIG. 8, may store an operating system utilized to control the operation of the computing device 800. The operating system may comprise a version of the LINUX operating system. The operating system may comprise a version of the WINDOWS SERVER operating system from the MICROSOFT Corporation. According to additional aspects, the operating system may comprise a version of the UNIX operating system. Various mobile phone operating systems, such as IOS and ANDROID, may also be utilized. It should be appreciated that other operating systems may also be utilized. The mass storage device 828 may store other system or application programs and data utilized by the computing device 800.

The mass storage device 828 or other computer-readable storage media may also be encoded with computer-executable instructions, which, when loaded into the computing device 800, transforms the computing device from a general-purpose computing system into a special-purpose computer capable of implementing the aspects described herein. These computer-executable instructions transform the computing device 800 by specifying how the CPU(s) 804 transition between states, as described herein. The computing device 800 may have access to computer-readable storage media storing computer-executable instructions, which, when executed by the computing device 800, may perform the methods described in relation to FIGS. 6-7.

A computing device, such as the computing device 800 depicted in FIG. 8, may also include an input/output controller 832 for receiving and processing input from a number of input devices, such as a keyboard, a mouse, a touchpad, a touch screen, an electronic stylus, or other type of input device. Similarly, an input/output controller 832 may provide output to a display, such as a computer monitor, a flat-panel display, a digital projector, a printer, a plotter, or other type of output device. It will be appreciated that the computing device 800 may not include all of the components shown in FIG. 8, may include other components that are not explicitly shown in FIG. 8, or may utilize an architecture completely different than that shown in FIG. 8.

As described herein, a computing device may be a physical computing device, such as the computing device 800 of FIG. 8. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes—from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium.

More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method comprising:
    determining a point within a content item based on a scene change;
    determining, based on the point, at least one frame of the content item;
    determining, based at least on a bitrate, a first quantization value;
    determining, during encoding a first portion of the content item using the first quantization value, a first duration associated with the first portion of the content item, the first portion of the content item comprising the at least one frame;
    determining, based at least on the bitrate, a second quantization value; and
    determining, during encoding a second portion of the content item using the second quantization value, a second duration associated with the second portion of the content item, the second portion of the content item comprising at least another frame of the content item.

2. The method of claim 1, wherein the first portion of the content item occurs after the point, the second portion of the content item occurs after the first portion of the content item, and the second quantization value is lower than the first quantization value.

3. The method of claim 1, wherein the first portion of the content item occurs before the point, the second portion of the content item occurs after the first portion of the content item and before the point, and the second quantization value is greater than the first quantization value.

4. The method of claim 1, wherein determining, based on the bitrate and the point, the first quantization value for encoding the at least one frame comprises determining that the first quantization value minimizes a cost function associated with encoding the at least one frame,
wherein determining, based on the bitrate, the second quantization value for encoding the at least another frame comprises determining that the second quantization value minimizes the cost function associated with encoding the at least another frame, and
wherein the cost function is equal to a sum of a distortion threshold and a function of a quantization parameter multiplied by the bitrate.

5. The method of claim 1, wherein determining, based on encoding the at least one frame using the first quantization value, the first duration associated with the first portion of the content item comprises determining a time at which a first distortion associated with encoding the at least one frame using the first quantization value does not satisfy a distortion threshold, and
wherein determining, based on encoding the at least another frame using the second quantization value, the second duration associated with the second portion of the content item comprises determining a time at which a second distortion associated with encoding the at least another frame using the second quantization value does not satisfy the distortion threshold.

6. The method of claim 5, wherein the distortion threshold is based on a threshold below which a human visual system cannot perceive changes,
wherein determining the time at which the first distortion associated with encoding the at least one frame using the first quantization value does not satisfy the distortion threshold comprises determining that the first distortion exceeds the threshold below which the human visual system cannot perceive changes, and
wherein determining the time at which the second distortion associated with encoding the at least another frame using the second quantization value does not satisfy the distortion threshold comprises determining that the second distortion exceeds the threshold below which the human visual system cannot perceive changes.

7. The method of claim 1, further comprising, before determining the first quantization value for encoding the at least one frame:
determining a type associated with the at least one frame, and wherein determining the first quantization value for encoding the at least one frame is further based on the type associated with the at least one frame.

8. The method of claim 7, wherein the type associated with the at least one frame is indicative of at least one of whether the at least one frame is a reference frame or a non-reference frame or whether the at least one frame is an I, P, or B frame.

9. The method of claim 1, further comprising:
determining, based at least on the first quantization value, a resolution change associated with encoding the at least one frame.

10. The method of claim 1, wherein the at least another frame is different than the at least one frame and the second quantization value is different than the first quantization value.

11. A method comprising:
receiving a content item comprising a plurality of points that each correspond to a scene change in the content item;
during encoding the content item, determining, for each of the plurality of points, a duration associated with at least one portion of a first plurality of adjacent portions of the content item occurring before the point, wherein the at least one portion of the first plurality of adjacent portions is associated with a different quantization value than the other portions in the first plurality of adjacent portions;
during encoding the content item, determining, for each of the plurality of points, a duration associated with at least one portion of a second plurality of adjacent portions of the content item occurring after the point, wherein the at least one portion of the second plurality of adjacent portions is associated with a different quantization value than the other portions in the second plurality of adjacent portions.

12. The method of claim 11, wherein encoding the content item comprises:
encoding each portion of the first plurality of adjacent portions and the second plurality of adjacent portions using a respective quantization value associated with that portion.

13. The method of claim 11, wherein determining, for each of the plurality of points, the first plurality of adjacent portions comprises determining, for each of the plurality of points, a duration associated with each portion of the first plurality of adjacent portions, and
wherein determining, for each of the plurality of points, the second plurality of adjacent portions comprises determining, for each of the plurality of points, a duration associated with each portion of the second plurality of adjacent portions.

14. The method of claim 13, wherein determining, for each of the plurality of points, the duration associated with each portion of the first plurality of adjacent portions comprises determining a time at which a distortion associated with encoding each portion of the first plurality of adjacent portions using a respective quantization value associated with that portion does not satisfy a distortion threshold, and
wherein determining, for each of the plurality of points, the duration associated with each portion of the second plurality of adjacent portions comprises determining a time at which a distortion associated with encoding each portion of the second plurality of adjacent portions using a respective quantization value associated with that portion does not satisfy the distortion threshold.

15. The method of claim 11, wherein each portion of the first plurality of adjacent portions and each portion of the second plurality of adjacent portions comprises at least one frame of the content item.

16. The method of claim 11, further comprising:
determining, for each of the plurality of points, the quantization value associated with each portion of the first plurality of adjacent portions and each portion of the second plurality of adjacent portions.

17. The method of claim 16, wherein determining, for each of the plurality of points, the quantization value associated with each portion of the first plurality of adjacent portions and each portion of the second plurality of adjacent portions comprises:
determining that each quantization value minimizes a cost function associated with encoding the respective portion of the content item,
wherein the cost function is equal to a sum of a distortion threshold and a function of a quantization parameter multiplied by a predetermined bitrate.

18. A device comprising:
one or more processors; and
memory storing instructions that, when executed by the one or more processors, cause the device to:
determine a point within a content item based on a scene change;
determine, based on the point, at least one frame of the content item;
determine, based at least on a bitrate, a first quantization value;
determine, during encoding a first portion of the content item using the first quantization value, a first duration associated with the first portion of the content item, the first portion of the content item comprising the at least one frame;
determine, based at least on the bitrate, a second quantization value; and
determine, during encoding a second portion of the content item using the second quantization value, a second duration associated with the second portion of the content item, the second portion of the content item comprising at least another frame of the content item.

19. The device of claim 18, wherein the first portion of the content item occurs after the point, the second portion of the content item occurs after the first portion of the content item, and the second quantization value is smaller than the first quantization value.

20. The device of claim 18, wherein the first portion of the content item occurs before the point, the second portion of the content item occurs after the first portion of the content item and before the point, and the second quantization value is larger than the first quantization value.

* * * * *